United States Patent
Odueyungbo et al.

(10) Patent No.: US 7,078,439 B2
(45) Date of Patent: Jul. 18, 2006

(54) SYSTEMS AND METHODS FOR CATALYST/HYDROCARBON PRODUCT SEPARATION

(75) Inventors: Oluwaseyi A. Odueyungbo, Ponca City, OK (US); Rafael L. Espinoza, Ponca City, OK (US); Sergio R. Mohedas, Ponca City, OK (US); James Dale Ortego, Jr., Ponca City, OK (US); Beatrice C. Ortego, Ponca City, OK (US); Ralph T. Goodwin, Ponca City, OK (US); Todd H. Harkins, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 30 days.

(21) Appl. No.: 10/753,140

(22) Filed: Jan. 7, 2004

(65) Prior Publication Data

US 2004/0171702 A1    Sep. 2, 2004

Related U.S. Application Data

(63) Continuation-in-part of application No. 10/034,452, filed on Dec. 28, 2001, now Pat. No. 6,720,358.

(51) Int. Cl.
  *C07C 27/00* (2006.01)
  *B01D 24/00* (2006.01)
  *B01D 21/00* (2006.01)
  *B01D 12/00* (2006.01)

(52) U.S. Cl. .................. 518/700; 518/715; 210/295; 210/304; 210/513

(58) Field of Classification Search ............ 518/700, 518/715; 210/295, 304, 513
  See application file for complete search history.

(56) References Cited

U.S. PATENT DOCUMENTS

| 2,718,308 A | 9/1955 | Le Bus |
| 3,768,648 A | 10/1973 | Anderson et al. |
| 3,919,084 A | 11/1975 | Bebech |
| 4,133,758 A | 1/1979 | Davis et al. |

(Continued)

FOREIGN PATENT DOCUMENTS

FR    2 560 868    9/1985

(Continued)

OTHER PUBLICATIONS

Farley, R. & Ray, D.J.; *The Design and Operation of a Pilot-Scale Plant for Hydrocarbon Synthesis in the Slurry Phase*; Journal of the Institute of Petroleum; vol. 50, No. 482; (1964); (pp. 27-46).

(Continued)

*Primary Examiner*—J. Parsa
(74) *Attorney, Agent, or Firm*—Conley Rose P.C.

(57) ABSTRACT

This invention relates to methods and apparatus for separating liquid products and catalyst particles from a slurry used in a Fischer-Tropsch reactor system. The preferred embodiments of the present invention are characterized by a separation system that uses a sedimentation chamber, which contains at least one inclined channel that enhances the settling of particles within the slurry. The enhanced settling separates the slurry into a catalyst-rich bottom stream and a catalyst-lean overhead stream. The catalyst-rich bottom product stream is preferably recycled to the reactor, while the catalyst-lean overhead stream can be further processed by a secondary separation system to produce valuable synthetic fuels. The inclined channel may be provided by a structure selected from the group consisting of tube, pipe, conduit, sheets, trays, walls, plates, and combinations thereof.

43 Claims, 11 Drawing Sheets

U.S. PATENT DOCUMENTS

| | | | |
|---|---|---|---|
| 4,221,671 | A | 9/1980 | Meurer |
| 4,228,943 | A | 10/1980 | Tanabe et al. |
| 4,605,678 | A | 8/1986 | Brennan et al. |
| 4,783,255 | A | 11/1988 | Bogusch |
| 5,049,278 | A | 9/1991 | Galper |
| 5,510,393 | A | 4/1996 | Coffman |
| 5,520,890 | A | 5/1996 | Lorentzen et al. |
| 5,527,473 | A | 6/1996 | Ackerman |
| 5,770,629 | A | 6/1998 | Degeorge et al. |
| 5,811,469 | A * | 9/1998 | Leviness et al. ............ 518/700 |
| 5,827,903 | A | 10/1998 | White et al. |
| 6,068,760 | A | 5/2000 | Benham et al. |
| 6,217,830 | B1 | 4/2001 | Roberts et al. |
| 6,344,490 | B1 | 2/2002 | DeGeorge et al. |
| 6,476,086 | B1 | 11/2002 | Zhou |
| 6,712,982 | B1 | 3/2004 | Bohn et al. |
| 6,730,221 | B1 | 5/2004 | Bohn et al. |
| 6,812,179 | B1 | 11/2004 | Huang et al. |
| 2002/0179506 | A1* | 12/2002 | Bohn et al. .................... 210/97 |
| 2003/0018089 | A1 | 1/2003 | Schweitzer et al. |

FOREIGN PATENT DOCUMENTS

| | | |
|---|---|---|
| FR | 2 802 832 | 6/2001 |
| GB | 1 591 658 | 6/1981 |
| WO | WO 02/097007 A2 | 12/2002 |

OTHER PUBLICATIONS

R. Davis et al; *Particle classification for dilute suspensions using an inclined settler*; Industrial and Engineering Chemistry Research, (1989), vol. 28, pp. 785-793.

S.M. Ghiaasiaan, et al; *Hydrodynamic characteristics of counter-current two-phase flow in vertical and inclined channels; effects of liquid properties*; International Journal of Multiphase Flow; (1997), vol. 23(6), pp. 1063-1083.

R.H. Davis et al; *Sedimentation of noncolloidal particles at low Reynolds numbers*; (1985) Ann Rv Fluid Mech. vol. 17, pp. 91-118.

R. H. Davis et al; *Classification of concentrated suspensions using inclined settlers*; (1996) International Journal of Multiphase Flow, vol. 22 (2); pp. 563-574.

A. Tripathi et al; *A new criterion for the continuous operation of supersettlers in the bottom feeding mode*; (1996) International Journal of Multiphase Flow, vol. 22(2); pp. 353-361.

Kapoor B. et al; *Flow of a Sediment on an Inclined Plate*; (1995) J. Fluid Mech. 290, pp. 39-66.

Leung W. F. et al; *Lamella and tube settlers. 1 Model and Operation*; (1983) Ind. Eng. Chem. Process Des. Dev. vol. 22, pp. 58-67.

Leung W.F.; *Lamella and tube settlers, II Flow Stability*; (1983) Ind. Eng. Chem. Process Des. Dev. vol. 22, pp. 68-73.

Davis, R.H., et al.; *Wave Formation and Growth During Sedimentation in Narrow Tilted Channels*; (1983) Phys. Fluids 26, pp. 2055-2064.

Shaqfeh, E.S.C. et al; *Enhanced Sedimentation in Vessels with Inclined Walls; Experimental Observations*; (1987) Phys. Fluids 30, pp. 1905-1914.

Borhan, A. et al.; *The Sedimentation of Nondilute Suspensions in Inclined Settlers*; (1988) Phys. Fluids 31, pp. 3488-3501.

Zhang, K. et al; *On the Nature of the Instability in Buoyancy-Driven Flows in Inclined Settlers*; (1992) Phys. Fluids A4, pp. 1156-1164.

Acrivos, A. et al; *Enhanced sedimentation in settling tanks with inclined walls*; (1979); J. Fluid Mech. vol. 92, pp. 435-457.

Acrivos, A., et al; *Enhanced Sedimentation in Vessels Having Inclined Wallas. The Boycott Effect*; Theory of Dispersed Multiphase Flow; pp. 81-95; R.E. Meyer, Ed. Academic Press (1983).

Herboizheimer, E., et al; *Enhanced Sedimentation in Arrow Tilted Channels*; (1981) J. Fluid Mech. vol. 108, pp. 485-499.

International Search Report for Appln. No. PCT/US04/00200 dated Jan. 27, 2005 (3 p.).

Zhou, P.Z., "Status Review of Fischer-Tropsch Slurry Reactor/Catalyst Wax Separation Techniques", prepared for the U.S. Department of Energy, Pittsburgh Energy Technology Center, Burns and Roe Services Corporation (Feb. 1991).

Bechtel Corporation, "Alternative fuel and chemicals from synthesis gas-Topical Report: Fischer-Tropsch Wax/Catalyst Separation Study", Report No. DE-FC22-95PC93052-23, prepared for Air Products and Chemicals, Inc., under DOE Contact# FC22-95PC93052;OSTI ID No. 750407 (May 1, 1996).

Anderson, J. et al, "Early Entrance Co-production Plant-Phase II Topical Report: Task 2.3: Fischer-Tropsch Catalyst/Wax Separation", prepared by Texaco Energy Systems LLC under DOE Cooperative Agreement Contact# FC26-99FT40658; OSTI ID No. 823183 (Aug. 21, 2003).

* cited by examiner

US 7,078,439 B2

SYSTEMS AND METHODS FOR CATALYST/HYDROCARBON PRODUCT SEPARATION

CROSS-REFERENCE TO RELATED APPLICATIONS

This application is a continuation-in-part application of U.S. utility application Ser. No. 10/034,452, filed on Dec. 28, 2001 now U.S. Pat. No. 6,720,358, entitled "Water Stripping and Catalyst/Liquid Product Separation System," which is hereby incorporated by reference herein, in its entirety.

STATEMENT REGARDING FEDERALLY SPONSORED RESEARCH OR DEVELOPMENT

Not applicable.

FIELD OF THE INVENTION

The present invention relates generally to methods and apparatus for controlling the distribution of solid, liquid, and gas phases in a slurry bubble reactor. More particularly, the present invention relates to methods and apparatus employing sedimentation to separate solid particles and a liquid from a mixture thereof. Still more particularly, the present invention relates to using inclined channels in the recovery of hydrocarbon products from a hydrocarbon synthesis slurry reactor, where the slurry comprises catalyst particles.

BACKGROUND

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of an amount of gas is so much greater than the volume of the same number of gas molecules in a liquefied state, the process of transporting natural gas typically includes chilling and/or pressurizing the natural gas in order to liquefy it. However, this contributes to the final cost of the natural gas and is not economical for formations containing small amounts of natural gas.

Further, naturally occurring sources of crude oil used for liquid fuels such as gasoline, jet fuel, kerosene, and diesel fuel have been decreasing and supplies are not expected to meet demand in the coming years. Fuels that are liquid under standard atmospheric conditions have the advantage that in addition to their value, they can be transported more easily in a pipeline than natural gas, since they do not require liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is converted with an oxidant such as water, molecular oxygen, or combination to form synthesis gas, which is a combination of carbon monoxide gas and hydrogen gas. In the second transformation, known as the Fischer-Tropsch synthesis, carbon monoxide and hydrogen react over a catalyst to form organic molecules containing carbon and hydrogen, also known as hydrocarbons.

When hydrocarbons also contain oxygen, they are known as oxygenates. Hydrocarbons having carbons linked in a straight chain are known as linear hydrocarbons. Saturated hydrocarbons with single carbon-carbon bonds are called paraffins, and unsaturated hydrocarbons with double carbon-carbon bonds are known as olefins. Linear saturated hydrocarbons are particularly desirable as the basis of synthetic diesel fuel.

The Fischer-Tropsch synthesis is commonly facilitated by a catalyst. Catalysts desirably have the function of increasing the rate of a reaction without being consumed by the reaction. Common catalysts for use in the Fischer-Tropsch synthesis contain at least one metal from Groups 8, 9, or 10 of the Periodic Table (in the new IUPAC notation, which is used throughout the present specification), particularly nickel, iron, cobalt, and ruthenium. H. Schulz (Applied Catalysis A: General 1999, 186, p 3) gives an overview of trends in Fischer-Tropsch catalysis.

The catalyst may be contacted with synthesis gas in a variety of reaction zones that may include one or more reactors in series or parallel. Commonly used reactors include packed bed (also termed fixed bed) reactors and slurry bed reactors. Originally, the Fischer-Tropsch synthesis was carried out in packed bed reactors. Because the Fischer-Tropsch synthesis is highly exothermic, proper temperature control within the reactor is a critical element. Packed bed reactors tend to have poor temperature control, compared to gas-agitated slurry reactors or slurry bubble column reactors. Gas-agitated multiphase reactors sometimes called "slurry reactors," "ebulliating bed reactor," or "slurry bubble column reactors," operate by suspending catalytic particles in liquid and feeding gas reactants into the bottom of the reactor through a gas distributor, which produces gas bubbles. As the gas bubbles rise through the reactor, the reactants are absorbed into the liquid and diffuse to the catalyst where, depending on the catalyst system, they are typically converted to products which are liquid and/or gaseous under reaction conditions. The gaseous products formed enter the gas bubbles and are collected at the top of the reactor.

The products generated via the Fischer-Tropsch synthesis comprise a mixture of hydrocarbons containing from 1 to about 100 carbons or more. These hydrocarbon products are gaseous or liquid under reaction conditions. Under reaction conditions, liquid products comprise wax hydrocarbons, which are typically solid or semi-solid at standard conditions of temperature and pressure. Waxes can be further hydroprocessed for example in a hydrocracking unit to produce shorter, more branched hydrocarbons in the diesel range, thereby increasing the degree of isomerization of the diesel range hydrocarbons pool. Wax hydrocarbons are highly desirable for the production of fuel such as diesel, therefore good selectivity towards wax hydrocarbons is preferred, such that Fischer-Tropsch liquid product comprises a large amount of wax hydrocarbons.

Because of the continuous formation of products, it is necessary to continuously or intermittently remove them. The extraction of slurry from the reactor necessitates the separation of the Fischer-Tropsch liquid products (which include waxes) from the catalyst in order to substantially recycle the catalyst particles to the reactor, as well as to obtain clean liquid products. The substantial recycling of the catalyst back into the reactor is necessary to maintain catalyst inventory in the reactor in order to have a more cost effective process. The terms "wax hydrocarbon products", "liquid products" and "wax" will be used interchangeably herethrough, as it is expected that the liquid hydrocarbon products comprises a majority of wax hydrocarbons. The terms "catalyst-wax separation" may be used for conciseness throughout the specification, and should by no mean limit the disclosure to the separation of catalyst from only wax. It implies separation of catalyst from liquid hydrocarbons (which might comprise wax).

Several techniques have been proposed for separating the catalyst from the liquid hydrocarbons, e.g., centrifuges, sintered metal filters, cross-flow filters, magnetic separators, gravitational settling, etc.

Filtration has proven to be one preferred catalyst-wax separation method used in the Fischer-Tropsch process. In conventional filtration techniques, a slurry is fed to the filtration unit that divides the slurry into a filtrate stream having a relatively low concentration of catalyst particles and a concentrated slurry stream having a relatively high concentration of catalyst particles. The concentrated slurry stream is then recycled to the reactor while the filtrate stream is processed to produce useful hydrocarbons. One of the major problems facing filtration systems is a decrease in filter efficiency over time (for example by plugging the filter substrate, by a decrease in permeability, and/or by a reduction in filtrate rate), which necessitates remedial action (such as backwashing of filter substrate, cleaning of filter substrate, and/or replacing of filter substrate) to resume a desirable filtration efficiency. Variation of filtration efficiency may result in unsteady production of liquid products, and the necessary maintenance is costly in operational down-time and/or additional capital costs.

Another known separation method employs a body force and is known as gravitational settling, also known as sedimentation, which seeks to take advantage of the differences in density between the solid particles and the liquid. Gravitational settling, as its name indicates, uses the action of gravitational force for suspended solids in a liquid to settle leaving an upper region depleted in particles and the lower region more concentrated in particles. Another separation method, which also employs a body force, is centrifugation, or centrifugal separation. Types of centrifugal devices include centrifuges and hydrocyclones. Centrifuges and hydrocyclones seek to enhance the body force (so that it is greater than the gravitational force) applied to the particles in order to accelerate the movement of the solid particles through the liquid and to promote separation from the liquid of small particles that otherwise would remain suspended due to the influence of Brownian forces. Similar to conventional filtration systems, most gravitational and centrifugal separation systems divide the slurry drawn from the reactor into liquid output streams, with one stream having a high concentration of catalyst particles and the other stream having a low concentration of catalyst particles. As a unit operation, gravitational settling (or sedimentation) offers low capital and operating costs; however it can be inefficient in capturing solid particles that have very low settling rates. On the other end, centrifugal units may be more costly to operate, but typically have an increased efficiency compared to that of gravitational settling on solid particle with very low settling rates.

Severe hydrodynamic conditions inside a commercial slurry bubble column reactor, coupled with the desired long lifetime of the catalytic material, typically result in catalyst attrition. As the catalyst breaks down over time, sub-particles of various sizes may be created, including very small particles known as "fines," some of which may even be sub-micron in size. The presence of fines in the reactor tends to greatly reduce the effectiveness of the catalyst-wax separation system. With the presence of catalyst fines or sub-particles, conventional sedimentation may be ineffective in their separation. Typically, in the case of attrition-prone catalysts, sedimentation may be supplemented or complemented by centrifugation, filtration or ultra-filtration, which are much more costly and require high maintenance.

Despite its shortcomings of lower efficiency with small size particles, sedimentation is a commonly used process for the separation of suspended solids from a liquid as for example in the treatment of sewage, industrial wastewater, process water or drinking water. Wastewater treatment plants more particularly employ sedimentation for the collection of sediments, flocs, inorganic precipitates, and/or biological material, as sedimentation is cost effective and typically requires low maintenance. However, in many conventional sedimentation basins or clarifiers, many factors such as inlet and outlet turbulence, and inherent unequal flow distribution, can hinder the sedimentation, and therefore its efficacy.

Improvements in sedimentation technology for wastewater treatment has been possible by the use of inclined settlers, also called "lamellar" settlers or "supersettlers." These improved settlers are operated under two fundamental principles: shortened settling path and laminar flow. The settling path is shortened in a settling vessel by the use of inclined surfaces. Because the sedimentation time is directly proportional to the vertical settling distance, a reduction in settling path in inclined settlers results in much reduced retention times by an order of magnitude or more below those in corresponding vertical settlers. These settlers can be composed of either long narrow tubes or channels inclined from the vertical or of a large tank containing closely spaced inclined plates. Thus, laminar flow can also be easily maintained in long narrow passages of small cross-sectional area that characterize these improved settlers. Water enters the inclined settler tubes and is directed upward through the tubes. Each tube functions as a shallow settling zone. Solids collect typically on the lower surfaces of the tubes and settle to the bottom of the basin.

The phenomenon of enhanced sedimentation in inclined channels was first described in Boycott, A. E. (1920); "Sedimentation of blood corpuscles," Nature vol. 104, p. 532. A summary of early work on this subject is also described in Hill, W. D. (1974); "Boundary-enhanced Sedimentation due to Settling Convection," PhD thesis, Carnegie Mellon University, Pittsburgh, Pa. The fundamental mechanisms and governing equations for sedimentation on inclined surfaces are further explored in Davis & Acrivos, (1985), Ann Rev Fluid Mech., vol. 17, pp. 91–118; Kapoor & Acrivos (1995) J. Fluid Mech. vol. 290, pp. 39–66; Tripathi & Acrivos (1996) International Journal of Multiphase Flow, vol. 22 (2), pp. 353–361.

The shallow depth sedimentation by inclined channels primarily used in wastewater plants achieves high performance at low cost. Thus, unlike the improvement in wastewater sedimentation techniques, the development of efficient, high-yield catalyst-wax separation systems has been one of the limitations on the commercialization of the Fischer-Tropsch slurry reactor system, due in part to the formation of fines or sub-particles from attrition-prone catalysts, which in time reduce the separation efficiency and stability.

Thus, there remains a need in the art for cost-effective methods and apparatus to efficiently remove valuable clean liquid hydrocarbons from a catalyst-containing slurry so that a substantial portion of the catalyst particles can be returned to the reactor. Therefore, the embodiments of the present invention are directed to methods and apparatus for recovering clean liquid products from a slurry, while substantially maintaining catalyst inventory in a slurry reactor, that seek to overcome certain of the limitations of the prior art.

SUMMARY OF THE PREFERRED EMBODIMENTS

Accordingly, there are provided herein methods and apparatus for separating products comprising wax hydrocarbons and catalyst particles from a slurry used in a Fischer-Tropsch reactor system. The present invention relates generally to methods for controlling the distribution of solid, liquid, and gas phases in a slurry bubble reactor, by employing sedimentation to separate solid particles and a liquid from a mixture thereof.

In one embodiment, a method for removing all or part of a liquid product from a slurry reactor containing slurry comprising liquid product and catalyst, comprises (a) removing a portion of the slurry from the slurry reactor; (b) separating a portion of the liquid product from the slurry using density differences so as to form a catalyst-lean liquid product stream and a catalyst-rich stream; and (c) returning at least a portion of the catalyst-rich stram back to the reactor. In the preferred embodiments, the slurry is separated in a sedimentation zone into bottom stream that has a high content of catalyst particles (catalyst-rich stream) and an overhead stream that has a low content of catalyst particles (catalyst-lean liquid product stream). In one embodiment, at least a portion of the bottom stream, preferably most of the bottom stream, more preferably substantially all of the bottom stream, is recycled to the reactor while the overhead stream is used to produce valuable hydrocarbon liquids.

In another embodiment, a reactor system includes a slurry bubble column, or gas agitated, reactor system, wherein the reactor system has a slurry bubble column reactor containing a slurry comprising catalyst particles and liquid hydrocarbon products, and a catalyst-wax separation system from which all, or a portion of, the hydrocarbon products of the reactor are extracted. The catalyst-wax separation system includes a sedimentation zone wherein catalyst particles are allowed to settle out of the slurry. The catalyst-wax separation system may also include a side stream that bypasses the sedimentation zone.

In another embodiment, a reactor system comprises a reactor vessel comprising a slurry bed. The slurry bed contains liquid hydrocarbons and catalyst particles. A reactor slurry outlet and inlet are adapted to pass a slurry stream. The reactor system also contains a sedimentation chamber including at least one inclined channel. The slurry stream flows through the inclined channel, which provides a means for separating the slurry stream into a catalyst-rich stream and a catalyst-lean stream. A settler catalyst outlet is connected to a lower end of the sedimentation chamber and is adapted for passing the catalyst-rich stream. A settler product outlet is connected to an upper end of sedimentation chamber and is adapted for passing the catalyst-lean stream. A reactor catalyst recycle inlet is connected to the reactor vessel and is adapted to return at least a portion of the catalyst-rich stream to the reactor vessel.

In other embodiments, a method for recovering a hydrocarbon product from a slurry comprising catalyst particles comprises the steps of feeding a slurry stream comprising liquid hydrocarbons and catalyst particles into a sedimentation chamber having one inclined channel disposed therein; and passing the slurry stream through the inclined channel while most of the catalyst particles settle downwards in the inclined channel so as to form a catalyst-rich bottom stream and a catalyst-lean overhead stream. The at least one inclined channel, in the sedimentation chamber, enhances the settling of catalyst particles within the slurry. In a preferred embodiment, the sedimentation zone comprises preferably at least two inclined surfaces, and more preferably, a plurality of inclined surfaces. The inclined surfaces are preferably parallel so as to provide inclined channels. These inclined channels can be formed using pipes, conduits, tubes, plates, sheets, trays, walls, or combinations thereof.

In another embodiment of the present invention, the overhead stream contains at least a portion of catalyst sub-particles or fines. The liquid flow through the inclined channel(s) and/or the aspect ratio of the inclined channel(s) are selected such as to retain catalyst particles below a pre-determined size in the overhead stream so as to permanently remove them from the system, and not recycle them to the reactor.

Catalyst particles move by means of gravity down the inclined surface to an optional collection zone in the sedimentation chamber and are extracted from the sedimentation zone, forming a bottom stream enriched in catalyst particles. The slurry that flows over the inclined surface is removed from the sedimentation zone, forming an overhead stream. The bottom stream has a high content of catalyst particles (catalyst-rich) while the overhead stream will have a low concentration of catalyst particles (catalyst-lean). The catalyst-rich bottom stream may be in part or preferably totally recycled into the reactor. The catalyst-lean overhead stream can then be used to supply the totality, or a portion, of the liquid hydrocarbon products from the reactor system. A portion of the liquid hydrocarbon products may be provided by an auxiliary catalyst-wax separation unit, which may employ a similar inclined settler according to the present invention, a conventional settler, filtration, magnetic separation, centrifugation, and any combination thereof, such that the auxiliary catalyst-wax separation unit provides a catalyst-rich stream that is preferably recycled to the reactor and a catalyst-lean stream which would supply another portion of the liquid hydrocarbon products.

In one embodiment, the catalyst-lean overhead stream can be fed to a secondary catalyst-wax separation unit. In one embodiment, the catalyst-wax separation system according to the present invention may be employed to reduce the catalyst content of the slurry such as the overhead stream could have a catalyst content comprising from 0.02 times to 0.95 times the original catalyst content of the slurry stream feeding the catalyst-wax separation system. A non-limiting example may include passing a slurry stream comprising about 15–25 percent by volume of catalyst particles through an inclined settler according to the present invention to form an overhead stream comprising about 5 to 10 percent by volume of catalyst particles. Reducing the catalyst content in the overhead stream may improve the fluid properties of the slurry in the overhead stream. The overhead stream then can be further processed in a secondary catalyst-wax separation unit. The secondary catalyst-wax separation unit may comprise at least one separation technique selected from the group consisting of filtration, centrifugation, sedimentation, and hydrocyclone. Preferably, the secondary catalyst-wax separation unit comprises a filtration unit or another sedimentation zone. The sedimentation zone in the secondary catalyst-wax separation unit preferably comprises at least one inclined surface or at least one inclined channel. In an alternate embodiment, the catalyst-wax separation system according to the present invention may be employed to reduce the catalyst content in the overhead stream to a minimum level, but also to collect most of the sub-particles or fines in the overhead stream, and the overhead stream can be further processed in a secondary solid-liquid separation unit to generate a clean liquid hydrocarbon product. This collection of sub-particles or fines in the overhead stream allows their removal out of the reactor system, and minimizes their accumulation in the reactor system by not recycling them to the reactor. The secondary solid-liquid separation unit may comprise at least one separation technique selected from the group consisting of filtration, centrifugation, sedimentation, and hydrocyclone. Preferably, the secondary solid-liquid separation unit comprises a filtration unit. The filtration unit in the secondary solid-liquid separation unit can comprise a variety of different filtration devices such as cross-flow filters, polishing filters, cake filters, and combinations thereof. Additionally, when the filtration employs a filter cake, it is envisioned that the catalyst-lean overhead stream could be mixed with a slurry side stream from the reactor, which preferably has not passed through the sedimentation zone. The slurry side stream is provided so that a sufficient concentration of catalyst particles is available to support and maintain an effective filter cake.

Other embodiments include a method for removing solids from a slurry by flowing the slurry through one inclined channel, or a plurality of inclined channels, within a sedimentation zone to produce a catalyst-rich bottom stream and a catalyst-lean overhead stream. A suitable structure, which can provide an inclined channel, can be a tube, a pipe, a conduit, or at least two trays, walls, plates or sheets, and the like. A plurality of these structures generates a multitude of inclined channels or passages through which the slurry flows. Even though a parallel arrangement of plates, trays, sheets or walls is preferred to provide an inclined channel with a uniform depth along its length, other non-parallel arrangements may also be suitable. The terms "sheets", "plates", "walls", or "trays" do not imply only the use of a flat cross-sectional area, and in some embodiments, these structures may have a two-dimensional cross-sectional area such as, without wishing to be limiting, a "zigzag" pattern or a "wave" pattern.

The bottom stream may be recycled partially or totally to the reactor. The overhead stream can be used to supply all or part of the liquid hydrocarbon products by further processing, such as by filtration to further remove the small amount of catalyst particles present in the overhead stream. In some embodiment, the overhead stream is substantially free of catalyst particles, and a secondary catalyst-wax separation may not be necessary. In yet another alternate embodiment, the overhead stream may not have sufficient amount of catalyst particles and may be mixed with a side stream of unprocessed reactor slurry prior to a cake filtration in order to be effectively separated. It is envisioned that the sedimentation system provides at least one fraction of the liquid products, and that another catalyst-wax separation system could provide another fraction of the liquid products, wherein the other catalyst-wax separation system could employ centrifugation, filtration, magnetic separation, another sedimentation system, or combinations thereof.

Another embodiment includes a process for producing hydrocarbons by passing gaseous reactants into a reactor containing a slurry comprising a liquid and catalyst particles. At least a portion of gaseous reactants are converted into hydrocarbons over the catalyst particles, such that a portion of the hydrocarbons are liquid and the slurry includes the liquid hydrocarbons. A slurry stream comprising a portion of the slurry is fed to a sedimentation chamber having at least one inclined channel disposed therein, an upper product outlet, and a lower catalyst outlet. The slurry stream is passed through the at least one inclined channel while most of the catalyst particles settle in the inclined channel, so as to form a catalyst-rich stream and a catalyst-lean stream. The catalyst-lean stream is passed through the upper product outlet of the sedimentation chamber. The catalyst-rich stream is passed through the lower catalyst outlet of the sedimentation chamber. At least a portion of the catalyst-rich stream is recycled to the reactor. Preferably all of the catalyst-rich stream is recycled to the reactor.

In one embodiment, a reactor system suitable for hydrocarbon synthesis comprises: a reactor vessel comprising a slurry bed, wherein said slurry bed contains liquid hydrocarbons and catalyst particles; a reactor slurry outlet connected to the slurry bed, wherein the reactor slurry outlet is adapted to pass a slurry stream; a sedimentation chamber; a settler slurry inlet, wherein said settler slurry inlet is adapted to pass the slurry stream; at least one inclined channel disposed within the sedimentation chamber, wherein the slurry stream flows through the at least one inclined channel, and wherein the inclined channel provides a means for separating the slurry stream into a catalyst-rich stream and a catalyst-lean stream; a settler catalyst outlet connected to a lower end of sedimentation chamber, wherein the settler catalyst outlet is adapted for passing the catalyst-rich stream, a settler product outlet connected to an upper end of sedimentation chamber, wherein the settler product outlet is adapted for passing the catalyst-lean stream; optionally, a degasser which may be adapted to receive the slurry stream from the reactor vessel prior to feeding it to the sedimentation chamber through the settler slurry inlet, or adapted to receive the overhead stream from the sedimentation chamber; and a reactor catalyst recycle inlet connected to the reactor vessel, wherein the reactor catalyst recycle inlet is adapted for receiving at least a portion of said catalyst-rich stream to said reactor vessel. The at least one inclined channel may be provided by a pipe, a tube, or a conduit. Alternatively, the at least one inclined channel may be provided by trays, plates, walls, or sheets. In certain embodiments of the reactor system, the at least one inclined channel has an angle of inclination from the vertical between 2° and 85°, or between 3° and 75°, or between 5° and 45°. In certain embodiments of the reactor system, the at least one inclined channel has a length-to-depth aspect ratio greater than 2:1, or greater than 5:1, or greater than 10:1. In selected embodiments, the sedimentation chamber comprises a plurality of inclined channels. In other embodiments, the reactor vessel further comprises a reactants inlet into said reactor vessel for injecting gaseous reactants into said reactor; and wherein the system further comprises a degasser. The degasser may have a degasser inlet adapted to receive the slurry stream from the reactor vessel, and a degasser liquid outlet adapted to pass a degassed slurry stream; and further wherein the settler slurry inlet is adapted to receive the degassed slurry stream. Alternatively, the degasser may have a degasser inlet adapted to receive the catalyst-lean stream from the sedimentation chamber and a degasser liquid outlet adapted to pass a degassed catalyst-lean stream. In certain embodiments, the system uses a catalyst comprising a metal selected from Groups 8, 9, and 10 metals of the Periodic Table. In some embodiments, at least 90 percent by weight of the catalyst particles in the slurry bed comprise a size ranging from 10 to 200 microns. In alternate embodiments, the catalyst particles in the slurry bed comprise a weight average size ranging from 40 to 100 microns. In some embodiments, the system further comprises a secondary catalyst-liquid separation unit adapted to receive the catalyst-lean overhead stream from the sedimentation chamber, wherein said secondary catalyst-liquid separation unit may comprise centrifugation, filtration, magnetic separation, another sedimentation system, or combinations thereof. The secondary catalyst-liquid separation unit may be adapted to receive a bypass slurry stream from the reactor vessel that has bypassed said sedimentation chamber. In some embodiments, the reactor system may further comprise another catalyst-wax separation unit adapted to receive another slurry stream from the reactor vessel, such that the catalyst-wax sedimentation system according to the present invention provides one portion of the liquid hydrocarbon product, and the other catalyst-wax separation unit provides another portion of the liquid hydrocarbon product. The other catalyst-wax separation unit may employ centrifugation, filtration, magnetic separation, another sedimentation system, or combinations thereof.

Thus, the embodiments of present invention comprise a combination of features and advantages that enable substantial enhancement of the separation of catalyst particles from a slurry using sedimentation principles. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
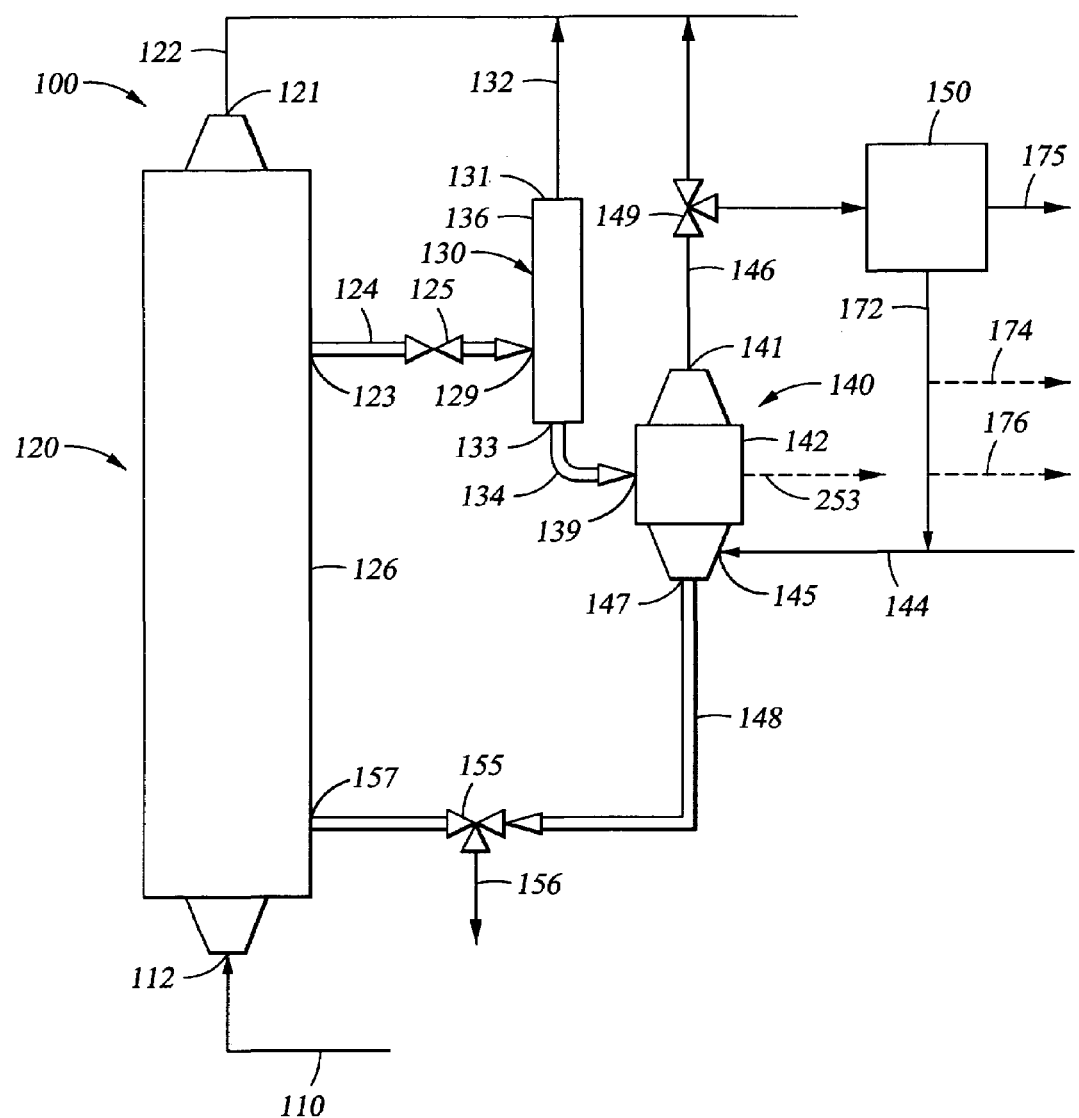
FIG. 1 is a schematic diagram of a Fischer-Tropsch reactor system including a gas-stripping unit in accordance with a preferred embodiment of the present invention.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The preferred embodiments of the present invention relate to methods and apparatus for removing a liquid product from a slurry having catalyst particles wherein at least a portion of which comprises very small catalyst sub-particles, also called catalyst fines. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In particular, various embodiments of the present invention provide a number of different methods and apparatus for removing a liquid product from a solid-containing slurry. The concepts of the invention are discussed in the context of a Fischer-Tropsch slurry bubble column reactor but, use of the concepts of the present invention is not limited to slurry bubble column reactors, or to the Fischer-Tropsch process in general, and may find use in any filtering or separating applications processing solid particles suspended in a liquid. It is to be fully recognized that the different teachings of the embodiments discussed below may be employed separately or in any suitable combination to produce the desired results.

Referring now to FIG. 1, a system 100 in accordance with a preferred embodiment of the present invention includes slurry reactor 120, a de-gasser 130, and a water stripping system 140. Reactor 120 includes a tank 126, a catalyst system (not shown), inlets 112 and 157, and outlets 121, and 123. De-gasser 130 preferably includes a tank 136, optional baffle plates (not shown), an inlet 129, and outlets 131 and 133. Water stripping system 140 includes a vessel 142, inlets 139 and 145, and outlets 141 and 147. If included, the baffle plates are preferably not heated. The interrelationship and separation of these components are discussed in detail below.

Slurry reactors operate by suspending catalytic particles in liquid by feeding gas reactants in line 110 into the bottom of reactor 120 through inlet 112, which produces gas bubbles (not shown). As the gas bubbles rise through the reactor, the reactants are absorbed into the liquid and diffuse to the catalyst where, depending on the catalyst system, they are converted to gaseous and liquid products. The gaseous products enter the gas bubbles and exit at the top of reactor 120 through outlet 121 into line 122. Liquid products 124 leave reactor 120 as a water-rich slurry via outlet 123 and enter de-gasser 130 at inlet 129. A valve 125 in line 124 regulates the flow of slurry to de-gasser 130. Outlet 123 is preferably positioned near the top of the slurry bed. It is known to operate slurry bed Fischer Tropsch reactors in a variety of ways, including but not limited to: plug flow of gas through the catalyst bed and well-mixed or back-mixed gas flow.

De-gasser 130 may include any suitable de-gassing equipment. For example, when liquid droplets are entrained in a gas, separation is enhanced by allowing the liquid drops to hit and adhere to a solid surface, such as a baffle plate. Similarly, when a gas is dissolved, and/or dispersed as a separate phase, in a liquid, separation may be enhanced by inducing the gaseous constituent to assume the vapor phase. Inducing the gaseous constituent to assume the vapor phase requires disturbing the equilibrium between the gas and the liquid. This may be done by heating the liquid, thus lowering the solubility of the gas, by passing a second gas through the liquid so as to sweep out the dissolved gas, or by lowering the pressure above the liquid. Various other de-gassing techniques are known in the art and can be used in the present system. In one preferred embodiment of the present invention, de-gasser 130 includes simply a baffle plate.

As the slurry enters de-gasser 130, it flows downward and is optionally guided by baffle plates (not shown). A portion of the gas dissolved in the slurry flows upward, forming a gas stream, which exits the top of de-gasser 130 into line 132 and a degassed water-rich slurry, which exits the bottom of de-gasser 130 into line 134. The gas stream 132 exits de-gasser 130 through outlet 131 at the top of de-gasser 130. The gas stream 132 may optionally be combined with gaseous stream 122, as shown. Degassed water-rich slurry line 134 exits de-gasser 130 via outlet 133 at the bottom of de-gasser 130 and enters water-stripping system 140 at inlet 139. The stream leaving de-gasser 130 via line 134 is preferably essentially free of gas bubbles and contains essentially all of the liquid and solids leaving reactor 120.

The slurry containing the liquids and solids flows from de-gasser 130 into stripping system 140, wherein it is stripped of water. A first embodiment of a stripping system 140 is illustrated in detail in FIG. 2. System 140 preferably includes a cylindrical column, or tower, 142 equipped with a gas inlet 145 and a distribution chamber 166 at the bottom; a liquid inlet 139 and an optional distributor 160 at the top; and liquid and gas outlets 147 and 141 at the bottom and top, respectively. The inlet liquid in line 134, which contains the water-rich slurry, is distributed into vessel 142 by distributor 160.

A dry stripping gas, such as hydrogen, methane, nitrogen, carbon or any combination of them, enters distribution chamber 166 at the bottom of vessel 142 and flows upward, countercurrent to the flow of the liquid. The dry stripping gas does not have to be 100% pure and it may contain small amounts of other gases, for instance, carbon monoxide, carbon dioxide, light hydrocarbons, etc. In some embodiments, the gas is sparged into vessel 142, increasing the area of contact between the liquid and gas, and encouraging intimate contact between the phases. Contact between phases can also be improved by placing packing elements 143, or metal tubes, rods, or screens (not shown) inside vessel 142 so as to slow the flow of the gas bubbles upward through the slurry. If packing elements 143 are used, it is preferred to provide a supporting grid (shown in phantom) beneath packing elements 143, so as to prevent them from settling on the bottom of vessel 142.

The water in the slurry is stripped by the dry gas entering the vessel, and water-rich gas leaves the top of the tower through outlet 141 into line 146. The water content in the slurry decreases as the slurry flows downward in vessel 142, so that the slurry leaving the bottom of vessel 142 through liquid outlet 147 is essentially water-free. The water-free slurry can be exported via line 148.

Referring again to FIG. 1, the de-watered slurry mixture 148 is more preferably recycled into reactor 120 at inlet 157 so that the catalyst is conserved. A valve 155 on line 148 regulates slurry flow to slurry reactor 120. In some embodiments, a portion 156 of slurry mixture 148 may be removed for other uses such as sampling for quality control purposes, etc.

Still referring to FIG. 1, the water-rich vapor phase stream leaving vessel 142 via line 146 comprises the gaseous stripping agent, water, and various amounts of other vaporized products such as unreacted stock from line 110, and part of the gaseous products formed in reactor 120. In some embodiments, system 140 may include a wet gas purifier 150, wherein wet gas stream 146 is separated into components including dry gas and water/light hydrocarbons mixture. A valve 149 may be used to send all or a portion of gaseous stream 146 to wet gas purifier 150 or to be mixed with streams 122 and/or 132. Dry gas from wet gas purifier 150 may then be recycled via line 172 back into vessel 142 via feed line 144. Optionally, either wet gas stream 146 or dry gas stream 172 may be combined with outlet streams 122 and/or 132. Also optionally, part or all of the dry gas in stream 172 may be sent to a further purification section (not shown) via line 174 or may be purged from the system via line 176.

In wet gas purifier 150, at least a portion of the gas stream in line 146 is condensed so that two phases are formed, namely a stripping agent rich phase and a water-rich phase. The stripping agent rich phase is preferably returned to stripper 140. Subsequent processing of the water-rich phase may be performed by processes known in the art to recover the material and render the water suitable for disposal.

Figure 3:
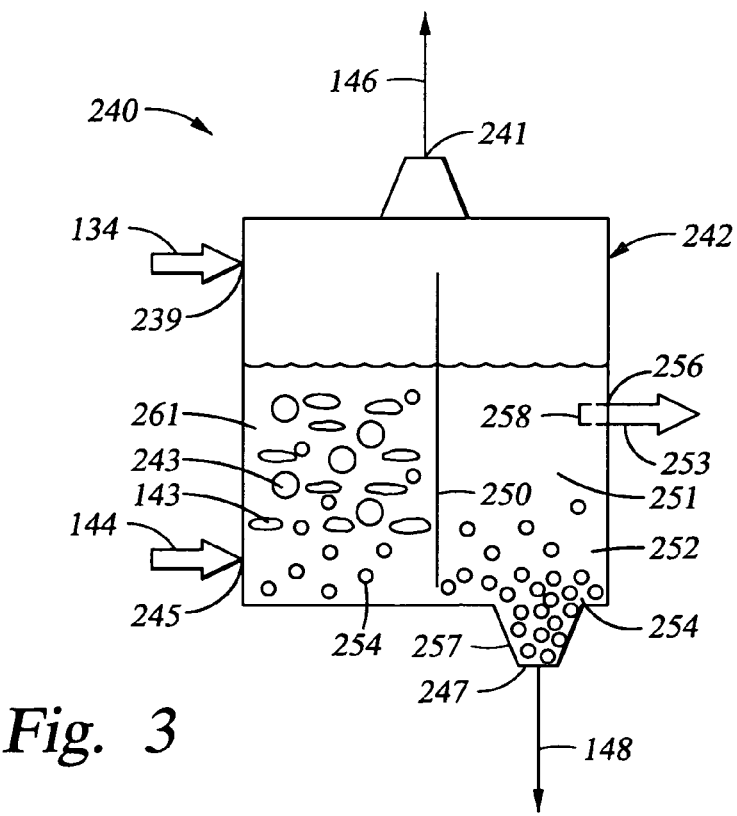
FIG. 3 is a schematic diagram of a gas stripping and settling system in accordance with a preferred embodiment of the present invention.

In some embodiments, in addition to stripping out the water, it may be desirable to separate a fraction of the liquid products from the catalyst prior to recycling the de-watered slurry. A stripping and settling system 240 that is suitable for this dual purpose is illustrated in FIG. 3. System 240 is an alternative to system 140, inasmuch as it includes a stripping vessel 242 equipped with a gas inlet 245, a slurry inlet 239, slurry and gas outlets 247 and 241 at the bottom and top, respectively. System 240 further includes a liquid outlet 253 intermediate between the top and bottom of vessel 242. System 240 preferably also includes at least one internal baffle plate 250 and may optionally include a slurry distributor (not shown) and a gas distribution chamber (not shown). Baffle plate 250 defines a sparging zone 261 on one side thereof and a quiescent zone 251 on the other side thereof.

The water-rich slurry containing catalyst particles, hydrocarbon liquids and water enters the top of vessel 242 via line 134. As in the embodiment of FIG. 2, a dry stripping gas enters the bottom of vessel 242 from line 144 and flows upward through the slurry. The dry stripping gas does not have to be 100% pure and it may contain small amounts of other gases, for instance, carbon monoxide, carbon dioxide, light hydrocarbons, etc. Preferably, the gas is sparged into vessel 242, forming bubbles 243. The water in the liquid is removed by the stripping gas, and water-rich stripping gas leaves the top of the vessel through outlet 241.

Because the catalyst particles are much denser than the liquids in the slurry, they begin settling as soon as the slurry enters the vessel. In sparging zone 261, however, rising gas bubbles 243 tend to prevent complete settling of the particles. Hence, in this embodiment, baffle plate 250 is preferably provided so as to define a quiescent zone 251 that is essentially free of rising gas bubbles and in which the hydrocarbon liquids 252 can be separated from the catalyst particles 254 using the density difference between the catalyst particles 254 and the liquid product 252. In a preferred operation, relatively or essentially water-free slurry flows under baffle plate 250 into quiescent zone 251. Because the catalyst particles 254 are denser than the liquid product 252, they tend to settle to the bottom of vessel 242.

Figure 4:
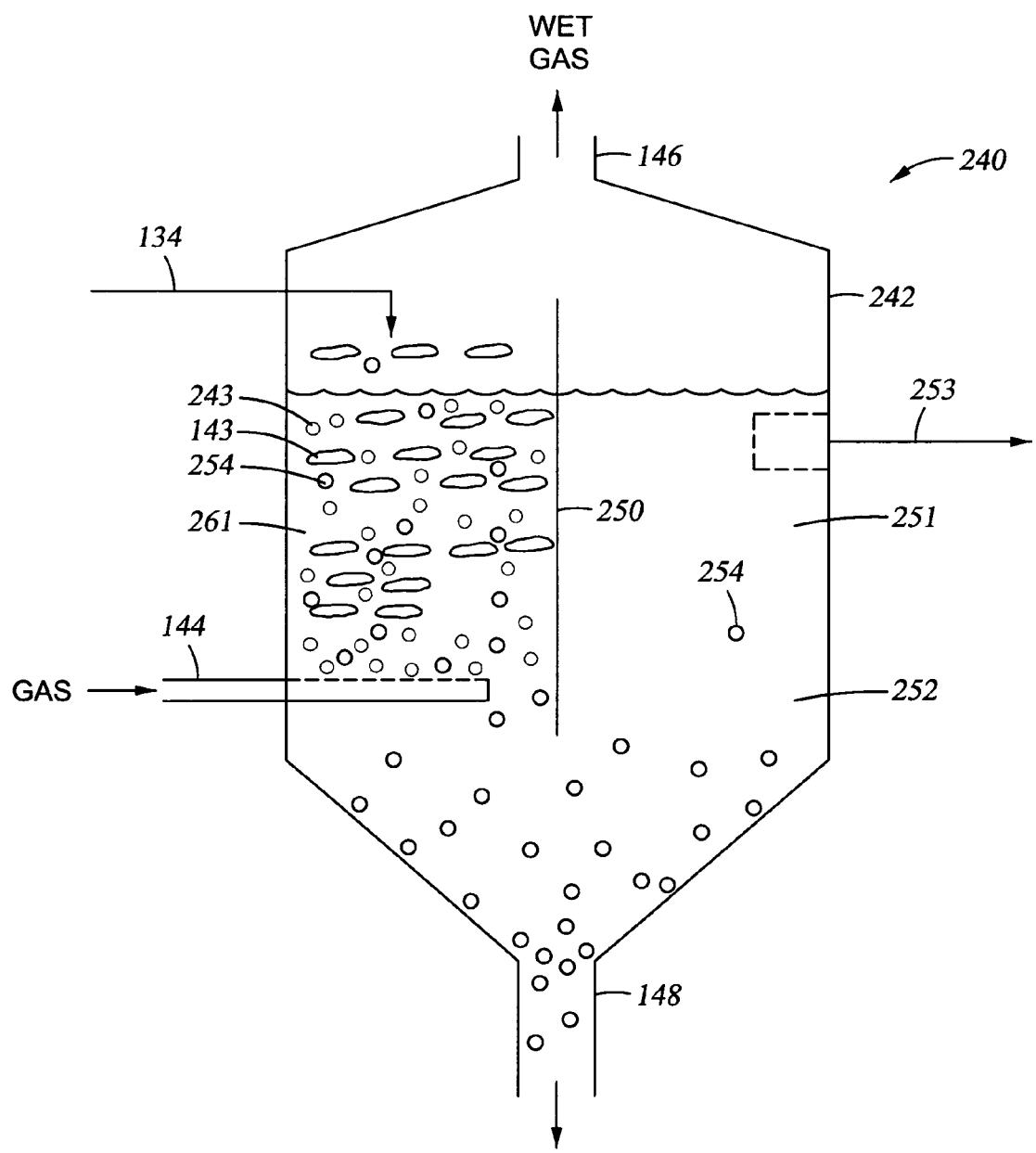
FIG. 4 is a schematic diagram of an alternative gas stripping and settling system in accordance with a preferred embodiment of the present invention.

In a preferred embodiment, vessel 242 is sized such that the residence time of the slurry therein is sufficient to allow most or essentially all of the catalyst particles to settle out of an upper portion of the hydrocarbon liquid. In another embodiment, vessel 242 is sized such that particles larger than 15 microns settle down at the bottom of vessel 242 and most of the small particles less than 15 microns for example, especially the catalyst sub-particles or fines, exit vessel 242 in hydrocarbon liquids 252. In this manner, catalyst sub-particles or fines are removed from the system, and are not re-circulated and returned to the reactor. In a further preferred embodiment, the floor of vessel 242 includes a collection area 257 in which further settling of particles 243 can occur. Collection area 257 is optionally positioned under quiescent zone 251. In some instances, it may be preferred to position outlet 247 as far away from sparging zone 261 as possible. In an alternative embodiment shown in FIG. 4, collection area 257 need not be positioned asymmetrically and can be conical or sloped so as to enhance settling and separation of particles 243. The settled catalyst and another portion of the liquid product exit the bottom of vessel 242 via outlet 247 and follow the preferably gravity-driven circulation loop 148 back to reactor 120 (FIG. 1). Sufficient liquid should be removed through outlet 247 to ensure that the catalyst-containing slurry in line 148 is flowable and, if necessary, pumpable.

A second portion of the liquid product, typically comprising catalyst-free or substantially catalyst-free liquid product, can be removed from vessel 242 via outlet 256. Outlet 256 is positioned preferably in quiescent zone 251 and at a sufficient height above the floor of vessel 242 to minimize the possibility that stray particles 254 will pass through it. If desired, a screen 258 may optionally be included at outlet 256, to ensure that no catalyst enters line 253. The amount of liquid withdrawn through line 253 is preferably set such that substantially no solid particles are withdrawn.

Figure 5:
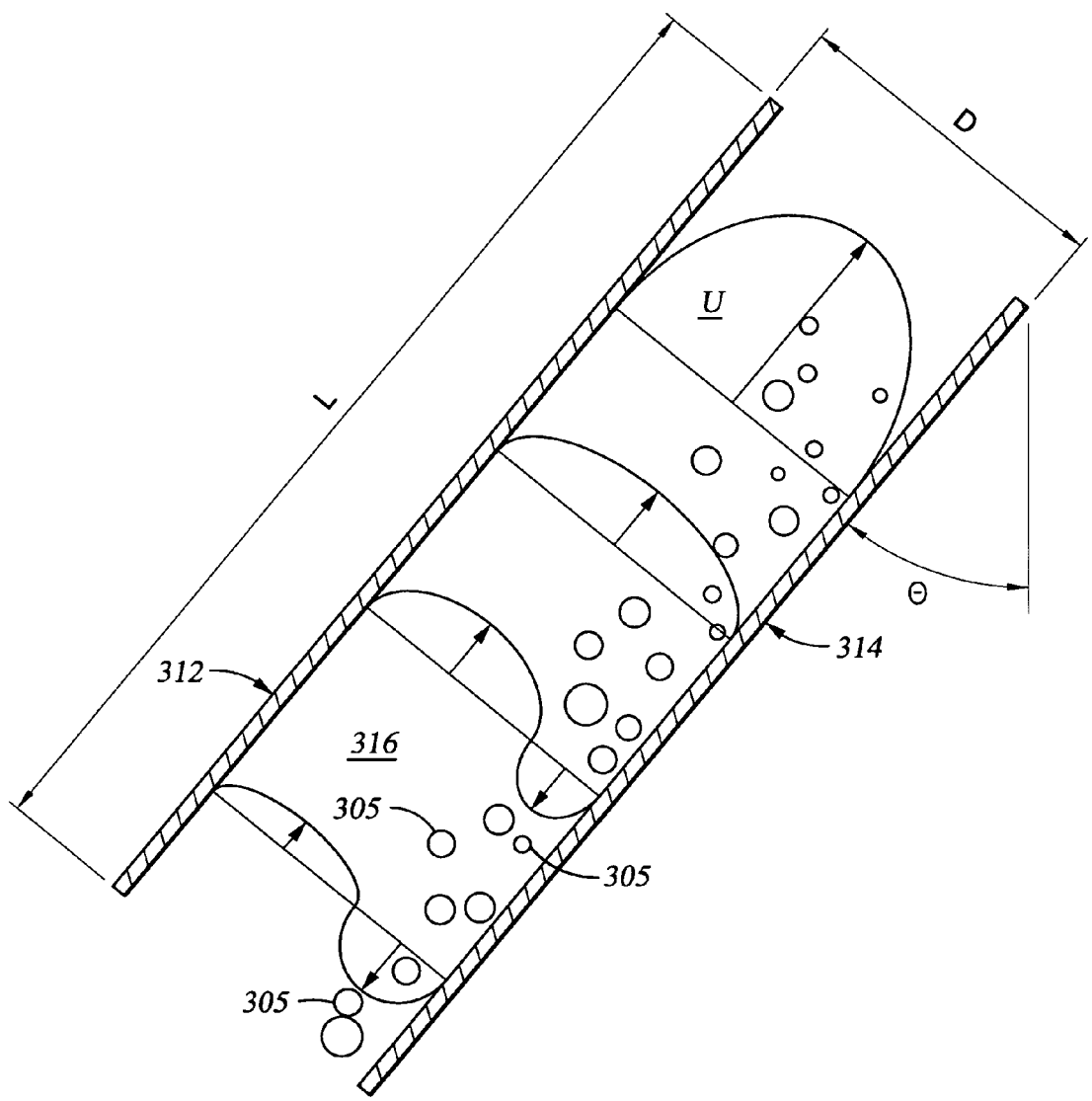
FIG. 5 is a schematic representation of the flow of catalyst and slurry between two inclined surfaces.

FIG. 5 illustrates the settling characteristics of particles 305 suspended in a slurry comprising a liquid. The slurry is flowing between an upper inclined surface 312 and a bottom inclined surface 314, in a mostly counter-current manner to that of the settling particles. The two inclined surfaces 312 and 314 create an inclined channel or passage 316 characterized by a length L and a depth D. Inclined channel 316 is preferably long and narrow, such that length-to-depth aspect ratio (L/D) is greater than 2:1, preferably greater than 5:1, more preferably greater than 10:1, still more preferably greater than 20:1. In addition D should be at least 10 times greater than the weight average size of particles 305. As used herein, the weight average particle size, $d_w$, is determined according to Equation (1).

$$d_w = \frac{\sum_{i=1}^{M} f_i d_i^4}{\sum_{i=1}^{M} f_i d_i^3} \quad (1)$$

where M is the number of different particle size fractions, $d_i$ is a typical diameter for particle size fraction i, and $f_i$ is determined according to Equation (2a) by dividing the number of particles in particle size fraction i, $n_i$, by the total number of particles, N, being determined according to Equation (2b).

$$f_i = \frac{n_i}{N} \quad (2a)$$

$$N = \sum_{i=1}^{M} n_i. \quad (2b)$$

By way of example and not by way of limitation, one method for determining $n_i$ is to count the number of particles in fraction i with a size equal to or greater than $(d_{i-1}+d_i)/2$ and less than $(d_{i+1}+d_i)/2$, except for the first fraction where $n_1$ represents the number of particles with a size less than $(d_1+d_2)/2$ and for the last fraction M where $n_M$ represents the number of particles with a size equal to or greater than $(d_{M-1}+d_M)/2$. As a non-limiting example with four particles size fractions (i.e., M=4) where $d_1$=5 microns, $d_2$=10 microns, $d_3$=20 microns and $d_4$=50 microns, $n_1$ would be the number of particles with a size greater than 0 and less than 7.5 microns; $n_2$ would be the number of particles with a size equal to or greater than 7.5 and less than 17.5 microns; $n_3$ would be the number of particles with a size equal to or greater than 17.5 and less than 37.5 microns; and $n_4$ would be the number of particles with a size equal to or greater than 37.5 microns.

The sedimentation of particles from the slurry employs the force of gravity and density difference to cause denser solid particles to fall through the liquid until they reach the bottom surface 314 of the inclined channel 316, where they migrate downwards and where they can be collected and removed. The speed at which the particles fall through the slurry is called "settling velocity" and is a function of particle size, density, and the fluid properties of the liquid. The settling velocity of a particle is not a function of the settling path, therefore as short of a settling path as possible is desired, since it will take less time for a particle to settle out of the slurry. In addition to the shortened settling path, the inclined channel or passage 316 created by two inclined plates or an inclined tube is preferably long and narrow so as to enforce a laminar flow of the slurry passing through that inclined channel 316. The laminar flow should further enhance the settling rate of the solid particles 305.

Figure 2:
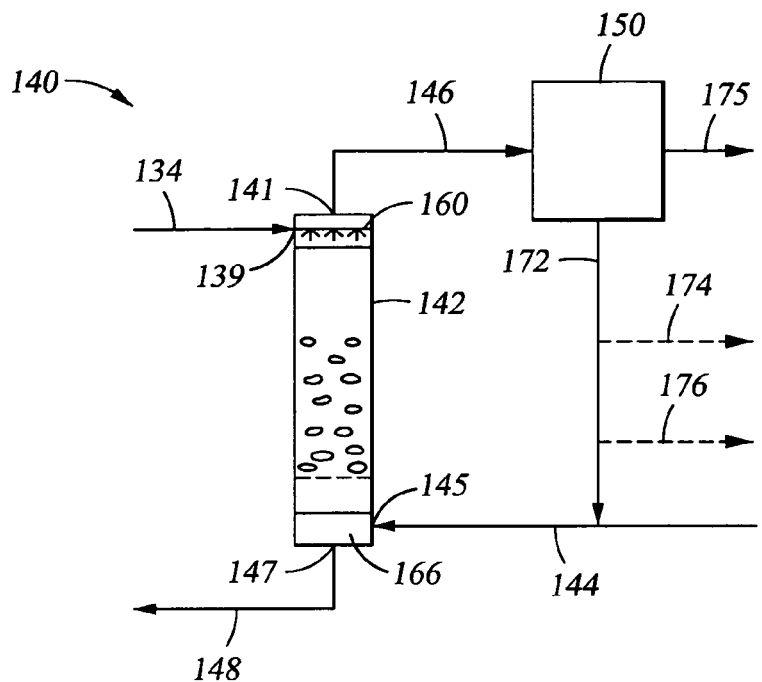
FIG. 2 is a schematic diagram of a first gas stripping system in accordance with one embodiment of the present invention.

The liquid velocity, indicated as U in FIG. 2, can vary in intensity and direction for any given radial position along the length L of the inclined channel 316. The liquid velocity profile near the top of the inclined channel 316 is generally counter-current to that of the particles 305, whereas the liquid velocity profile at the bottom of the inclined channel 316 provides at least in part a downward liquid flow. Therefore, a portion of the liquid flows along the bottom surface 314 in the similar direction as the particles, so as to create a catalyst-enriched stream with some liquid in an amount sufficient such that the catalyst-enriched stream is flowable, and so that there is not a significant deposition of particles 305 on the bottom surface 314.

Inclined surfaces or inclined channels disposed within a vessel of sufficient depth are one alternative to using a shallow sedimentation basin. A settler comprising one or more inclined channels or passages preferably includes at least two inclined plates (or sheets, trays, walls), each with an angle of inclination from the vertical (illustrated as θ for the bottom surface 314 in FIG. 5). The angle of inclination may be different for the plurality of inclined surfaces, but is preferably the same so as to achieve a parallel arrangement and/or to provide each inclined channel with the same depth along its length.

In certain embodiments, a settler may comprise one or more inclined channels or passages that are provided by a number of parallel, inclined plates or tubes. These plates or tubes are spaced closely together and act to decrease the effective settling path. The slurry flow passes upwards through the inclined channels and exits over the top edge of the plates or tubes. Solid particles settle out of the slurry onto the inclined bottom surface of the inclined channel and move, by means of gravity, counter currently down and along the inclined bottom surface.

A settling enhancement factor, S, can be defined by the ratio of the maximum catalyst-lean stream withdrawal rate from a settler inclined at an angle θ of inclination from the vertical to the maximum withdrawal rate from the same settler with a vertical (θ=0) orientation. The settling enhancement factor, S, of an inclined settler is defined by the following Equation (3):

$$S = \cos(\theta) + L/D \sin\theta \tag{3}$$

It can be seen in Equation (3) that the inclination angle θ from the vertical is critical to the settling enhancement factor. The inclined surfaces 312 and 314 which form inclined channel 316 should be set at an inclination angle θ from the vertical between 2° and 85°, preferably between 3° and 75°, more preferably between 5° and 45° from the vertical. The preferred angle of inclination θ from the vertical should promote surface self-cleaning and minimize particles accumulation on the inclined bottom surface 314. Further, for a given inclination angle θ, as can be seen in Equation (3), a higher length-to-depth (L/D) aspect ratio of the inclined channel 316 provides a higher settling enhancement factor S, and should be therefore more desirable.

Figure 6:
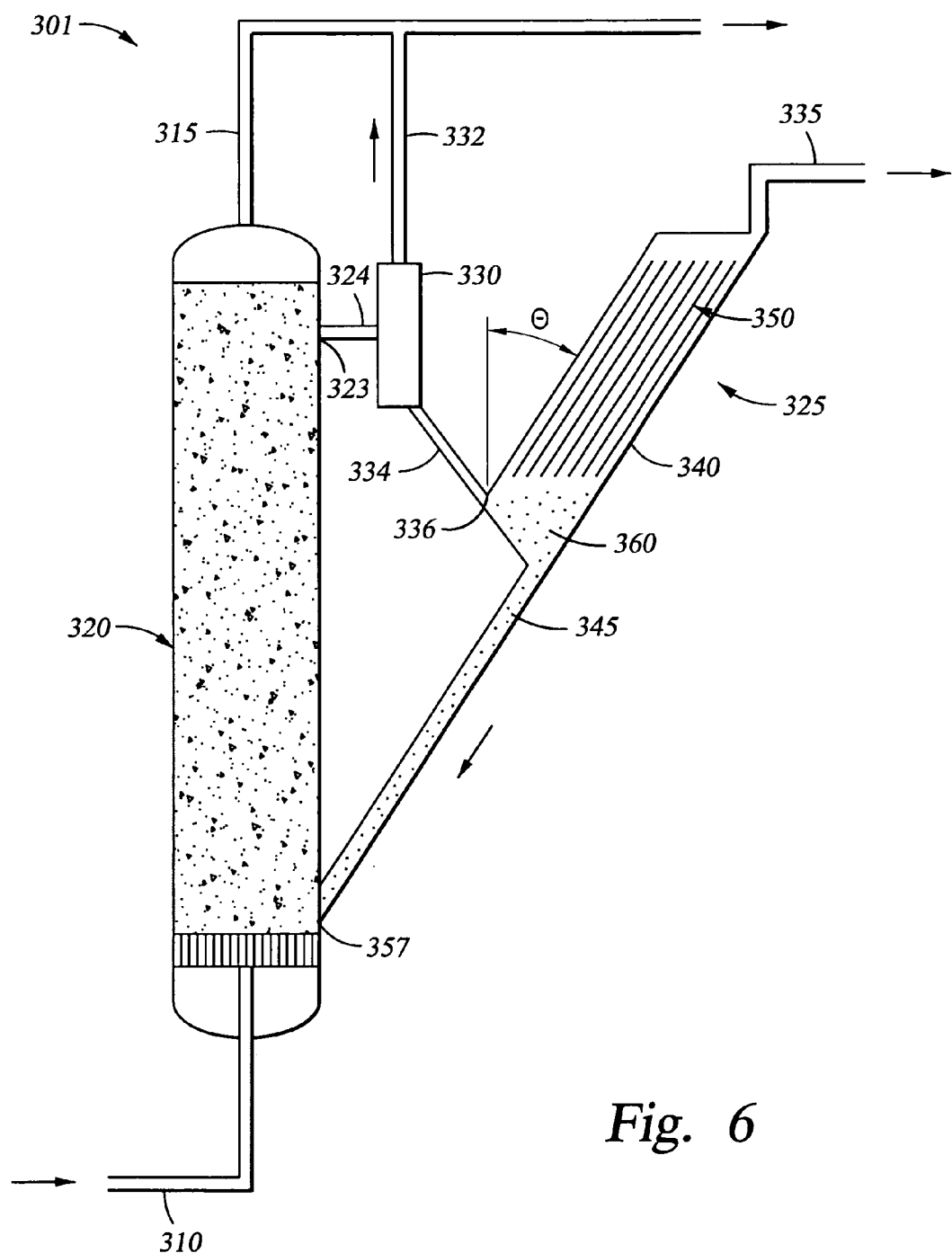
FIG. 6 is a flow diagram representing a reactor system with a catalyst-wax separation system including a plurality of inclined surfaces.

Referring now to FIG. 6, a reactor system 300 is presented. Reactor system 300 includes reactor 320 containing a catalyst slurry and having a gas inlet 310 and gas outlet 315. Slurry is removed from reactor 320 through slurry outlet 323 and processed through a degasser 330. Outlet 323 is preferably positioned in the top half of reactor 320, more preferably near the top of the slurry bed, and outlet 323 is adapted to pass slurry stream 324. Degasser 330 may include any suitable de-gassing equipment, such as is described in reference to FIG. 1. In one embodiment, degasser 330 comprises a baffle plate (not shown). Degasser 330 may be flooded by slurry stream 324 entering the degasser at a point located below the liquid level in degasser 330. Degasser 330 may alternatively not be flooded by slurry stream 324 entering the degasser at a point located above the liquid level in degasser 330.

A portion of the gas dispersed in the slurry entering degasser 330 flows up forming a degasser gas stream 332 which exits the top of degasser 330, and a degassed slurry stream 334 exits the bottom of degasser 330. A valve may be placed on the degasser gas stream 332 line in order to control the pressure of degasser 330. The degasser gas stream 332 may optionally be combined partially or totally (as shown) with gaseous product 315 from reactor 320. Degasser gas stream 332 may also be recycled to reactor 320 (not shown) especially if degasser gas stream 332 still contains some hydrogen and/or carbon monoxide. Degassed slurry stream 234 enters catalyst-wax separation system 325 at inlet 336. Separation system 325 may be gravity fed and rely on the density difference between the slurry inside reactor 320, which comprises dispersed gas, and the degassed slurry stream 334 exiting degasser 330, which is substantially gas-free. Alternatively, slurry stream 324 and/or degassed slurry stream 334 may be fed to degasser 330 and separation system 325 respectively, by the use of pumps or other suitable mechanical device capable of transferring these slurry streams to their respective unit.

Separation system 325 includes sedimentation chamber 340, which outputs a bottom stream 345 and an overhead stream 335. Sedimentation chamber 340 comprises a collection area 360 and a plurality of inclined channels provided by parallel plates 350, which are inclined by an angle θ of inclination from the vertical. Since a plurality of plates 350 are used to create the inclined channels, it is envisioned that a variety of cross-sectional areas for the inclined channels may be used depending on the range of the slurry flow rate, and the characteristics of solid particles and the liquid. For purpose of example and not by way of limitation, the cross-sectional area of the inclined channels may comprise a triangular shape, a rectangular shape, a square shape, a pentagonal shape, an hexagonal shape, a crescent shape, a shape with parallel convex lines, a shape with parallel V-type lines, and a shape with parallel U-type lines.

As degassed slurry stream 334 enters the sedimentation chamber via inlet 336, the slurry starts flowing mostly upwards and through the inclined channels. The difference in density between denser catalyst particles and liquid promotes a gravitational pull for catalyst particles to move downward toward collection area 360 so as to create a catalyst-rich stream (bottom stream 345), which is recycled entirely (illustrated) or partially (not illustrated) to reactor 320 at inlet 357. A sufficient amount of liquid should be present in catalyst-rich bottom stream 345 to ensure that catalyst-rich bottom stream 345 is flowable and, if necessary, pumpable. Preferably, flowing the slurry through the inclined channels employs a liquid velocity sufficient to obtain a catalyst-lean overhead stream comprising a number average particle size less than 20 microns, more preferably less than 15 microns, still more preferably less than 10 microns. As used herein, the number average particle size, $D_n$, is determined according to Equation (4), $$D_n \equiv \sum_{i=1}^{M} f_i d_i, \tag{4}$$

where M and $d_i$ are described earlier, and where $f_i$ is determined by Equation (2). In some embodiments, a substantial portion of particles in overhead stream 335, representing at least 80% by number of the particles, should have a particle size less than 20 microns. In another embodiment, at least 90% by number of the particles in overhead product stream 335 should have a particle size less than 15 microns.

Figure 7:
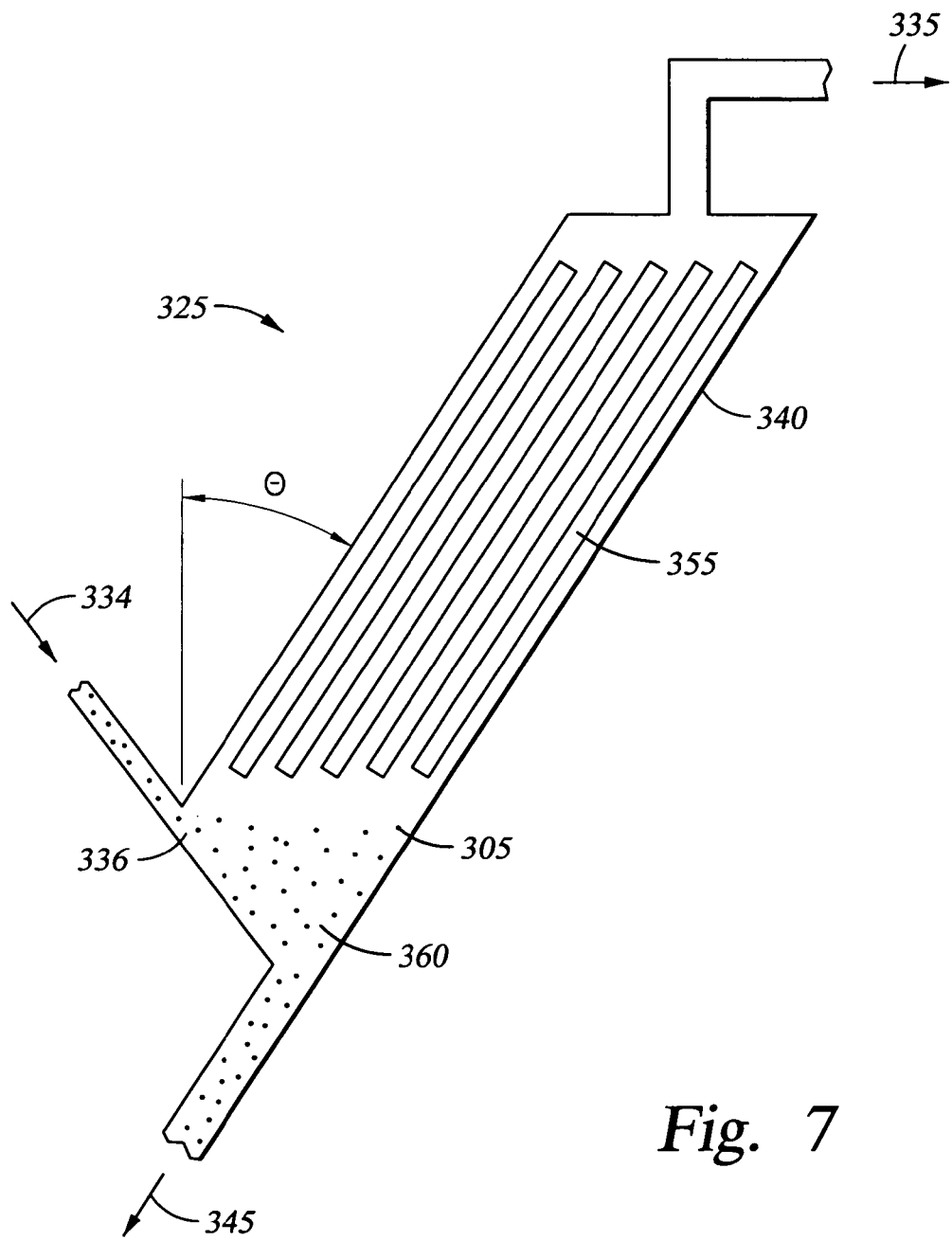
FIG. 7 is more detailed view of the catalyst-wax separation system of FIG. 6 including heated inclined surfaces.

FIG. 7 illustrates one embodiment of separation system 325, which outputs a bottom stream 345 and an overhead stream 335. Separation system 325 includes sedimentation chamber 340 with collection area 360 and a plurality of heated parallel plates 355, which are inclined by an angle θ of inclination from the vertical. Degassed slurry stream 334 enters the sedimentation chamber 340 via inlet 336, the slurry starts flowing mostly upwards between heated inclined plates 355. Heated plates 355 can provide the necessary heat to maintain the temperature of the slurry passing over them to a desirable range, and/or to adjust the temperature of the slurry passing over them so as to decrease the viscosity of the liquid comprising the slurry. Since the settling velocity of a solid particle in a liquid is inversely proportional to the liquid viscosity, a reduction in liquid viscosity would result in a faster settling time. In an alternate embodiment, heated parallel plates 355 may comprise a plurality of heated, parallel tubes through which the slurry flows, whereas a heating medium is in contact with the outside of the tubes. The heat from the heating medium is transferred to the slurry as it flows upwards inside the tubes so as to enhance the settling of most of the catalyst particles 305 towards the bottom of sedimentation chamber 340.

Figure 8:
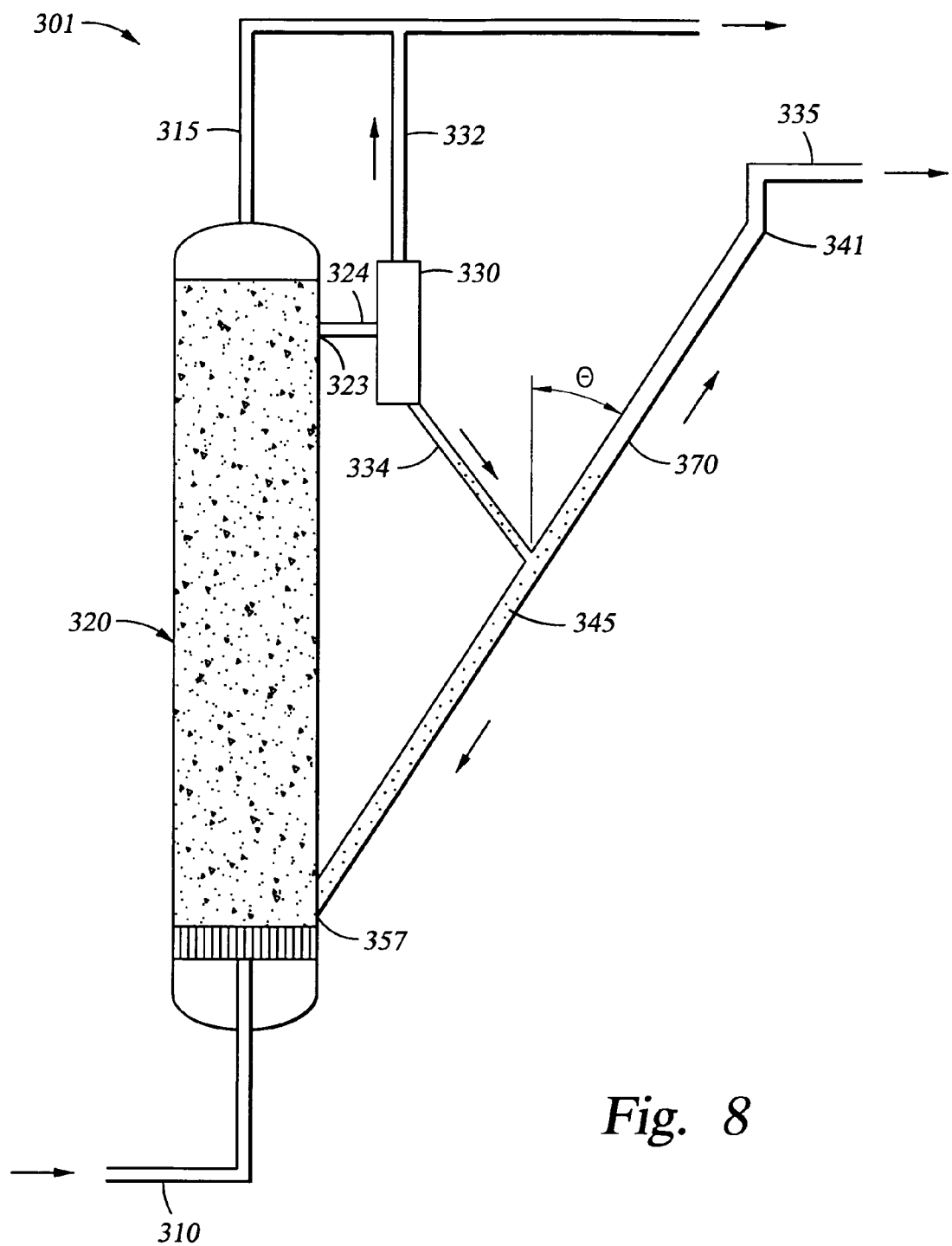
FIG. 8 is a flow diagram representing a reactor system with a catalyst-wax separation system including an inclined pipe.

Referring now to FIG. 8, a reactor system 301 is presented which is similar to reactor system 300 in FIG. 6, except that sedimentation chamber 340 includes a tube settler 370 which is inclined by an angle θ of inclination from the vertical, instead of a plurality of channels (such as provided by plates 350 shown in FIG. 6), to provide a downward particles flow which is generally countercurrent to an upward liquid flow. In addition, the sedimentation chamber 340 does not have a specific collection area. As degassed slurry stream 334 enters the sedimentation chamber via inlet 336, the slurry starts flowing upwards into pipe 370. The difference in density between catalyst and liquid promotes a gravitational pull for catalyst particles to move downward so as to create a catalyst-rich stream (bottom stream 345), which is recycled entirely (illustrated) or partially (not illustrated) to reactor 320.

As the slurry moves upward in the pipe, the slurry is getting increasingly leaner on catalyst particles, until it reaches the pipe exit 341 to generate overhead stream 335. Preferably, flowing the slurry upwards into the inclined channel employs a liquid velocity sufficient to obtain a catalyst-lean overhead stream comprising a substantial portion of catalyst particles of a size less than 20 microns, more preferably less than 15 microns, still more preferably less than 10 microns. The substantial portion of particles with a maximum size of less than 20 microns in overhead stream 335 represents at least 80% by number of the particles in overhead stream 335, preferably at least 90% by number of the particles. An optional heating element (not shown) may surround at least a portion of the tube settler 370. Maintaining, or increasing, the temperature of the slurry to a desirable level may enhance the settling efficiency. When the liquid comprises waxy hydrocarbons, the maintenance of the temperature may be necessary so as to prevent wax crystallization and it may be preferable to obtain a bottom stream 345 at a temperature, which is slightly below or within the operating temperature range of reactor 320.

When one or more inclined tubular units are used to create the inclined channel or channels, it is envisioned that a variety of cross-sectional areas for the tubular unit(s) can be used depending on the range of the slurry flow rate, and the characteristics of solid particles and the liquid. The relative efficiencies of different cross-sectional shapes in tube settler design have been reported by Anderson et al. in U.S. Pat. No. 3,768,648; Tanabe et al. in U.S. Pat. No. 4,122,017; and Bogusch in U.S. Pat. No. 4,783,255. Anderson et al. disclosed in '648 that a settling tube with a chevron configuration in an orientation with the central apex directed downward was more efficient than circular, hexagonal, diamond and square shaped tubes. Tanabe et al. in '017 and Bogusch in '255 patent disclosed that boomerang and approximate boomerang cross-sectional configurations, which are modifications of the chevron tube design in '648, eliminate the acute angle normally found in the chevron design between the tube's top walls and vertical side walls, which in turn result in slightly higher rate of flow in this region of the tube.

Figure 9:
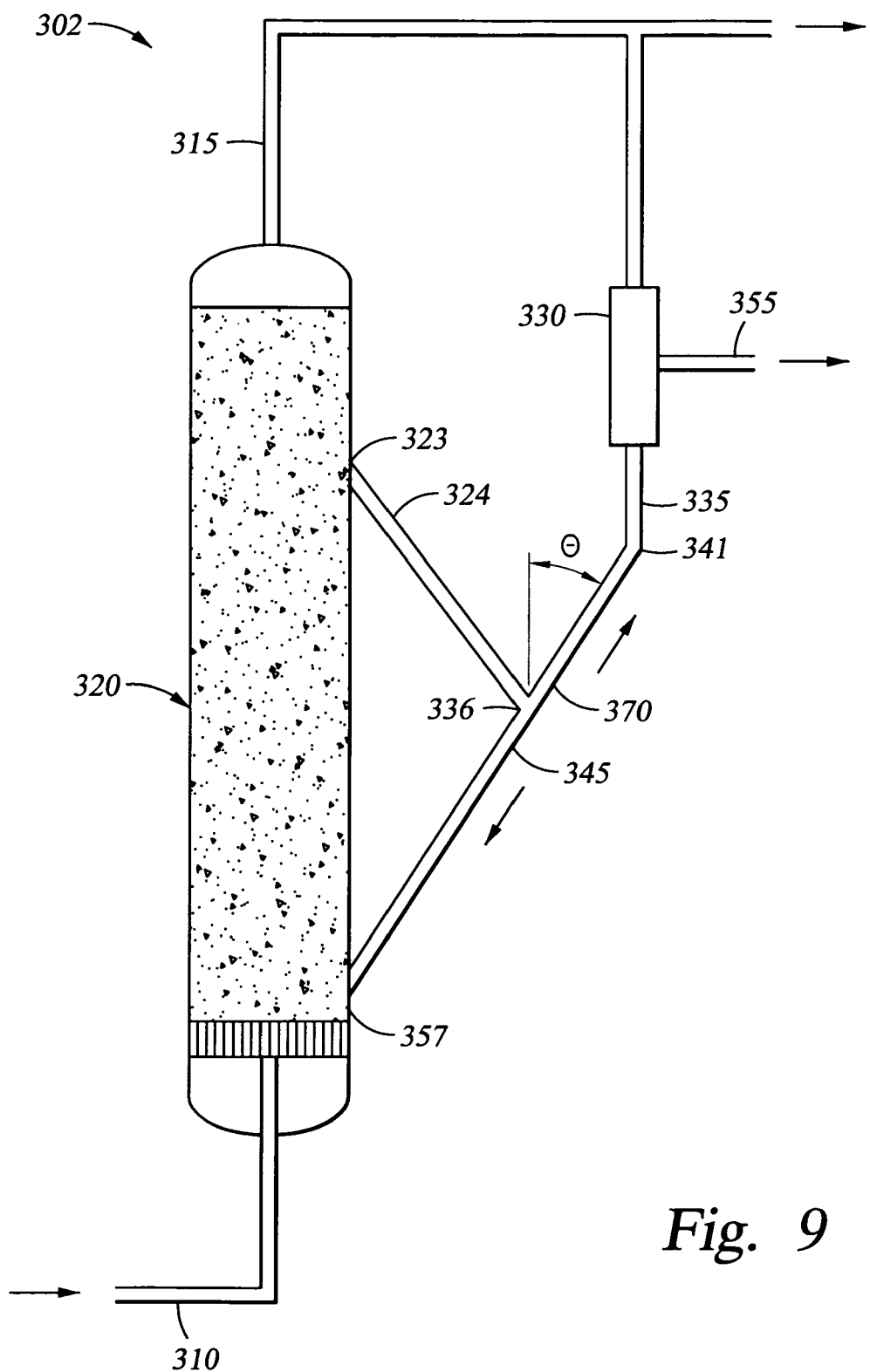
FIG. 9 is a flow diagram representing an alternate reactor system with a catalyst-wax separation system including an inclined pipe.

Referring now to FIG. 9, a reactor system 302 is provided. Reactor system 302 includes a reactor 320, a settling zone 370, and a degasser 330. Reactor 320 contains a slurry comprising particles and a liquid. Settling zone 370 includes at least one inclined channel or passage, and may comprise one or more structures selected for the group consisting of pipes, tubes, conduits, trays, plates, walls, sheet, and combinations thereof. These structures are preferably in a parallel arrangement. Degasser 330 comprises any suitable design as described for FIG. 1; and preferably comprises at least one baffle plate. A reactant gas 310 is fed to reactor 320 so as to maintain the particles in suspension into the liquid. A gaseous effluent 315 exits reactor 320 at the top. Slurry stream 324 leaves reactor 320 via outlet 323 and is sent via a conduit or pipe to settling zone 370 at inlet 336.

The slurry moves generally upwards through settling zone 370 as it gets leaner and leaner in particle content until a particle-lean overhead stream 335 exits settling zone 370 at outlet 341. The majority of the particles migrate down by enhanced settling with a portion of the liquid so that a particle-rich effluent stream 345 exits settling zone 370 on the opposite end of the settling zone 370. Particle-rich effluent stream 345 is recycled totally (as shown) or partially (not shown) to reactor 320 at inlet 357. Particle-lean overhead stream 335 is then fed to degasser 330 wherein most of the gas trapped and/or dispersed into the slurry is separated out from the slurry, and generates gas effluent 332, which exits degasser 330. Degasser gas effluent 332 may be combined totally (as shown) or partially with reactor gas effluent 315. Degasser 330 also provides a degassed particle-lean product stream 355.

Referring to FIGS. 6, 8 and 9, the location of inlet 357 for recycling particle-lean stream 345 to reactor 320 is preferably within the bottom half of reactor 320. More preferably, as shown in the three Figures, the position of inlet 357 is near the bottom of reactor 320 slightly above the distribution system for reactant gas 310. The main advantages of this more preferred location of inlet 357 are the use of the gas flow to re-disperse the recycled stream into reactor 320, as well as a greater residence time of the recycled particles in reactor 320. However other locations may be suitable as well.

Figure 10:
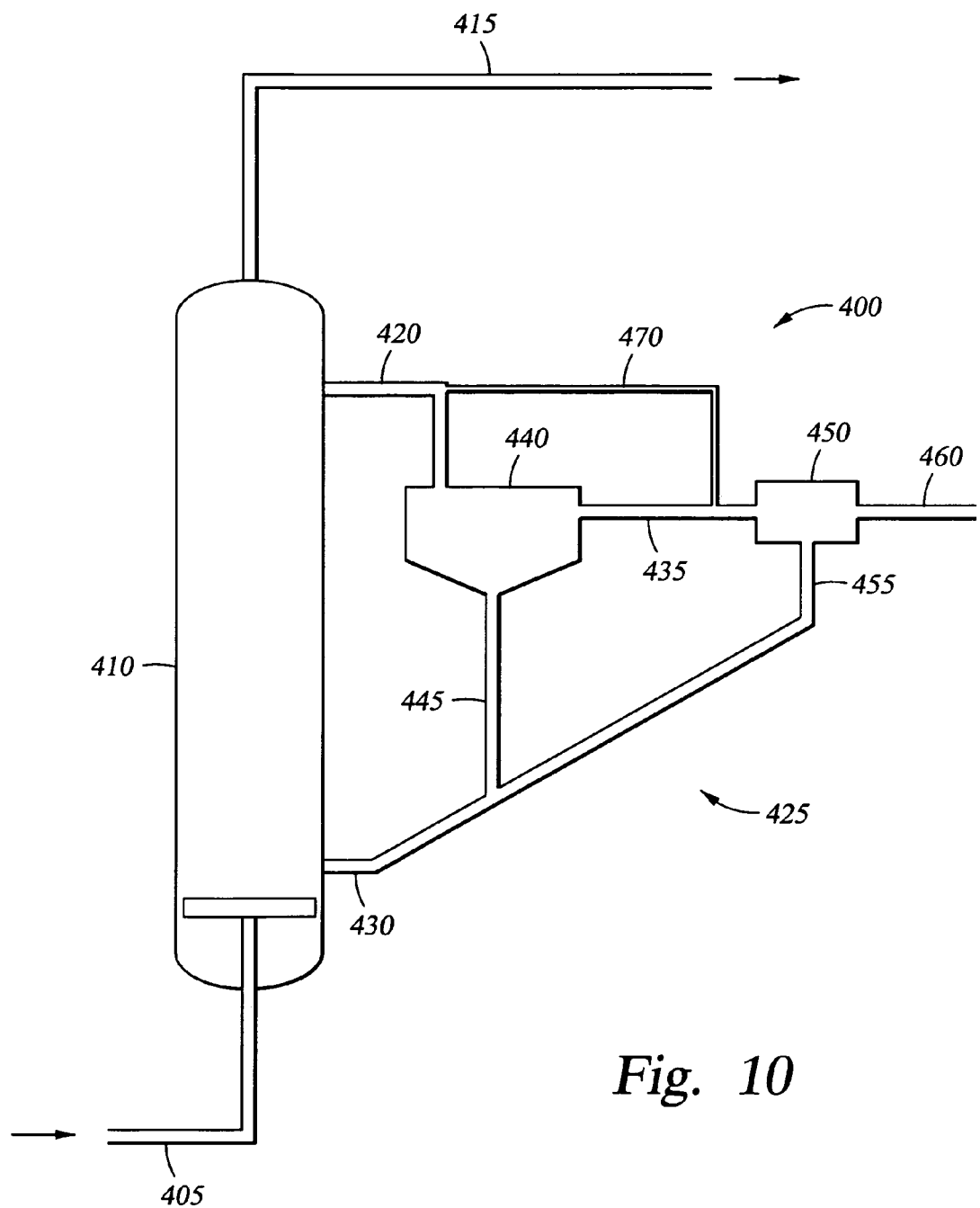
FIG. 10 is a flow diagram representing a reactor system with a catalyst-wax separation system employing a settling tank with inclined plates.

Referring now to FIG. 10, a reactor system 400 is presented. Reactor system 400 includes reactor 410 containing a catalyst slurry and having a gas inlet 405 and gas outlet 415. Slurry is removed from reactor 410 through slurry outlet 420, processed through catalyst-wax separation system 425 and returned to the reactor through slurry inlet 430. Separation system 425 includes sedimentation chamber 440, which outputs a bottom stream 445 and an overhead stream 435, and a filtration system 450, which outputs a retentate 455 and a filtrate 460. Separation system 425 may also include an optional side stream bypass 470, which removes a portion of the slurry from slurry outlet 420 and mixes it with overhead stream 435 prior to processing by filtration system 450. Bottom stream 445 and retentate 455 are recycled into reactor 410.

Figure 11:
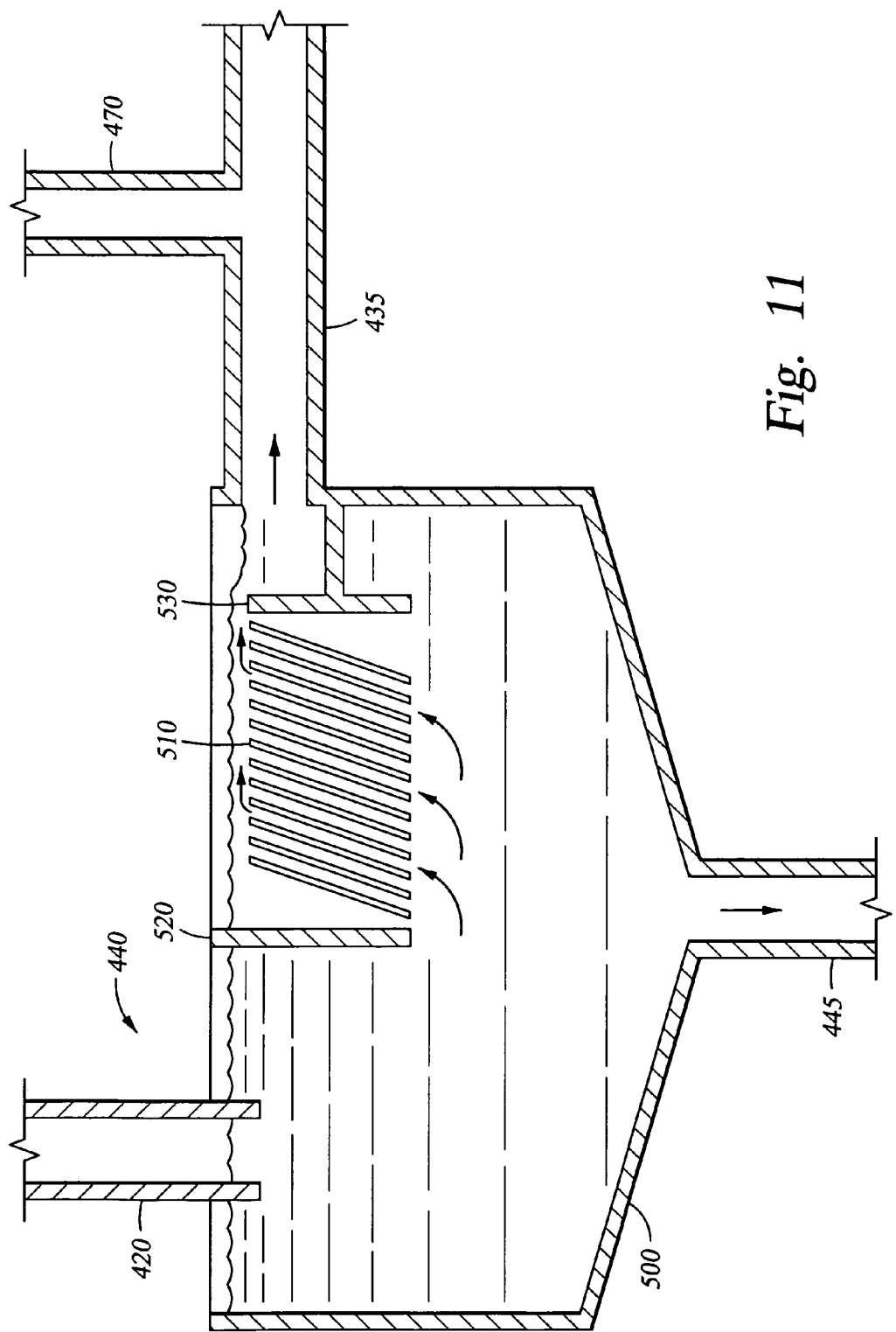
FIG. 11 is more detailed view of the catalyst-wax separation system of FIG. 10.

As can be seen in FIG. 11, sedimentation chamber 440 includes a sedimentation basin 500, dividing wall 520, a plurality of inclined plates 510, and weir 530. Slurry enters sedimentation basin 500 from reactor slurry outlet 420. Dividing wall 520 forces the slurry to flow underneath the wall and up and across inclined plates 510. The catalyst particles that settle out of the slurry fall to the bottom of basin 500 and are removed through bottom outlet 445. Slurry, now containing a low content of catalyst particles, flows above the top of inclined plates 510 and over weir 530 where it is removed from basin 500 through overhead outlet 435.

Inclined plates 510 may be any number of plates at any angle θ from the vertical between 2° and 85° suited for catalyst-liquid separation. Preferably, plates 510 are inclined with an angle θ from the vertical between 3° and 70°; more preferably between 5° and 45° from the vertical. Plates 510 may be adjustable up to 0° for cleaning purposes. It is also envisioned that a forced flow can be used to clean any obstruction or any deposit onto the surfaces of plates 510. The forced flow could employ high fluid velocity by a gas or a liquid, either downwards or upwards. If needs be, any technique using vibrations or ultrasounds could also be used to dislodge deposited solids from the inclined surfaces. Plates 510 may alternatively be closely spaced pipes, tubes, or other structures capable of providing inclined channels capable of allowing liquid to flow in a mostly upward manner. Basin 500 may also include a catalyst particle removal system to aid in the transport of catalyst particles from the bottom of the basin to outlet 445.

Referring back to FIG. 10, overhead stream 435 optionally combines with side stream 470 and feeds into filtration system 450 where a filter element removes from the stream a filtrate that is essentially free of catalyst particles. Optional side stream 470 may be mixed with overhead stream 435 to provide a sufficient concentration of catalyst particles to build and maintain a filter cake on the filter element. The retentate 455 is returned to reactor 410. The relatively catalyst free filtrate is removed through filtrate outlet 460 for further processing into valuable hydrocarbons.

The catalyst used in the various embodiments of hydrocarbon synthesis reactor systems comprises any suitable supported or precipitated catalyst active in the Fischer-Tropsch synthesis, such as a catalytically active metal from Groups 8, 9, and 10 of the Periodic Table of the Elements, New Notation, as found in, for example, the CRC Handbook of Chemistry and Physics, $82^{nd}$ Edition, 2001–2002, and used throughout this specification as the reference for all element group numbers. The catalyst preferably contains cobalt, nickel, iron, ruthenium, or combinations thereof. For cobalt, the catalyst preferably contains about 5 to 75 wt % cobalt and more preferably from about 10 to about 60 wt % cobalt. A supported cobalt catalyst preferably contains from about 15 to about 35 wt % cobalt. For iron, the catalyst preferably contains about 10 to 95 wt % iron, and more preferably from about 20 to about 85 wt % iron. For ruthenium, the catalyst is preferably supported and preferably contains about 0.5 to 10 wt % ruthenium and more preferably from about 1 to about 6 wt % ruthenium.

The catalyst may contain additionally one or more promoters comprising a metal selected from Group 1–17. A promoter metal is preferably selected from Group 1 (Li, K), Group 7 (Re), Group 8 (Ru, Os), Group 9 (Co, Rh, Ir), Group 10 (Ni, Pd, Pt), Group 11 (Cu, Ag), and Group 13 (B, Al).

If a catalyst support is used, the support preferably comprises unmodified, stabilized or modified alumina, silica, titania, zirconia, or combinations thereof. More preferably the catalyst support comprises alumina or silica-alumina. The catalyst is preferably in the form of discrete structures. The term "discrete" structure, as used herein, refers to supports in the form of divided materials such as balls, noodles, powders, granules, beads, pills, pellets, cylinders, trilobes, spheres, other rounded shapes, other manufactured configurations, and the like. Alternatively, the divided material may be in the form of irregularly shaped particles. In one preferred embodiment, the solid catalyst suspended in the slurry has a particle size distribution between about 1 and 250 microns. In one preferred slurry, 90 weight percent of the catalyst particles in the slurry are between 10 and 200 microns. The particles in the slurry should have a weight average particle size between 40 and 100 microns, preferably between 60 and 90 microns, wherein the weight average size is determined by Equation (1). The solid particles form between 5 and 25 volume percent of the slurry.

Cobalt catalysts are most preferred as they have a high activity and wax selectivity for the Fischer-Tropsch synthesis. A cobalt catalyst using stabilized or modified alumina is highly preferred when it is stabilized by one or more structural promoters, and/or when it is derived from boehmite or pseudo boehmite.

The density of the catalyst particles should be at least 0.1 g/ml greater than that of the liquid in the slurry. The particle density is preferably between about 1.2 g/ml and about 4.0 g/ml, whereas the density of the liquid within the slurry (at the temperature and pressure conditions used in the catalyst-wax separation system) is preferably between about 0.5 g/ml and about 0.95 g/ml, more preferably between about 0.6 g/ml and about 0.85 g/ml.

A process for producing hydrocarbons preferably includes contacting a feed stream that includes carbon monoxide and hydrogen with a suitable hydrocarbon synthesis hydrocarbon catalyst. Alternatively or in combination, a process for producing hydrocarbons includes contacting a feed stream that includes carbon monoxide and hydrogen with a catalyst in a reaction zone so as to produce hydrocarbons, wherein some of the hydrocarbon products are recovered from the process using the separation method and system according to this invention.

The feed gas charged to the process for producing hydrocarbons includes hydrogen, or a hydrogen source, and carbon monoxide. $H_2$/CO mixtures suitable as a feedstock for conversion to hydrocarbons according to the process of this invention can be obtained from light hydrocarbons such as methane by means of steam reforming, partial oxidation, or other processes known in the art. Preferably, the hydrogen is provided by free hydrogen, although some Fischer-Tropsch catalysts have sufficient water gas shift activity to convert some water and carbon monoxide to hydrogen and carbon dioxide, which produces hydrogen for use in the Fischer-Tropsch process. It is preferred that the molar ratio of hydrogen to carbon monoxide in the feed be greater than 0.5:1 (e.g., from about 0.67 to 2.5). Preferably, when cobalt, nickel, and/or ruthenium catalysts are used, the feed gas stream contains hydrogen and carbon monoxide in a molar ratio of about 1.6:1 to 2.3:1. Preferably, when iron catalysts are used, the feed gas stream contains hydrogen and carbon monoxide in a molar ratio between about 1.4:1 and 2.2:1. The feed gas may also contain carbon dioxide. The feed gas stream should contain only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, ammonia, hydrogen cyanide, and carbonyl sulfides.

The feed gas is contacted with the catalyst in a reaction zone. Mechanical arrangements of conventional design may be employed as the reaction zone preferably a slurry phase or slurry bubble column reactor. A preferred slurry bubble column is described in co-pending commonly assigned U.S. Published Patent Application 2003-0114543, which is incorporated herein by reference in its entirety. In a preferred embodiment of the present invention, the reaction zone includes a slurry bubble column, and the column includes a three-phase slurry. Further, a process for producing hydrocarbons by contacting a feed stream including carbon monoxide and hydrogen with a catalyst in a slurry bubble column preferably includes dispersing the particles of the catalyst in a liquid phase comprising the hydrocarbons and a gas phase to form a three-phase slurry. Further, the slurry bubble column preferably includes a vertical reactor, and dispersal preferably includes injection and distribution in the bottom half of the reactor.

The Fischer-Tropsch reactor is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume, wherein the volume of reactant gases is at standard pressure of 101 kPa and standard temperature of 0° C. Further, the reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C., more preferably from about 205° C. to about 230° C. The reaction zone pressure is typically in the range of about 80 psia (552 kPa) to about 1000 psia (6,895 kPa), more preferably from 80 psia (552 kPa) to about 800 psia (5,515 kPa), and still more preferably from about 140 psia (965 kPa) to about 750 psia (5,170 kPa). Most preferably, the reaction zone pressure is from about 250 psia (1,720 kPa) to about 650 psia (4,480 kPa).

The products resulting from the process will have a great range of molecular weights. Typically, the product hydrocarbons comprise one carbon atom $C_1$ (methane) and about 100 carbons or more per molecule as measured by current analytical techniques. The process is particularly useful for making hydrocarbons having five or more carbon atoms ($C_{5+}$), especially when the above-referenced preferred space velocity, temperature and pressure ranges are employed.

The wide range of hydrocarbons produced in the reaction zone will typically afford liquid and gaseous products at the reaction zone operating conditions (listed above). An effluent gaseous stream of the reaction zone can be cooled to condense condensable hydrocarbons and can be passed into a vapor-liquid separation zone separating into liquid and vapor phase products. The gaseous material can be passed into a second stage of cooling for recovery of additional hydrocarbons. A slurry effluent stream of the reaction zone typically contains a mixed phase stream including liquid and gas phase products. A portion of the liquid products is recovered from the slurry effluent stream by employing the methods and apparatus for separating liquid products from catalyst particles according to this invention. The recovered liquid products can be further sent to a fractionation step. Typically, a stripping column is employed first to remove light hydrocarbons such as propane and butane. The remaining hydrocarbons can be passed into a fractionation column in which they are separated by boiling point range into products such as naphtha, middle distillate such as diesel, and wax. Hydrocarbons recovered from the reaction zone and having a boiling point above that of the desired products (such as diesel and naphtha) can be passed into conventional processing equipment such as a hydroheating zone in order to convert alkenes and alcohols to alkanes, and/or a hydrocracking zone in order to reduce molecular weights of hydrocarbons to that of desired products such as middle distillates and gasoline. The gas phase recovered from the reaction zone effluent slurry stream in a degassing unit can be combined with the reactor gaseous effluent, and/or can be at least partially recycled to the reaction zone if it contains a sufficient quantity of hydrogen and/or carbon monoxide.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Figure 12:
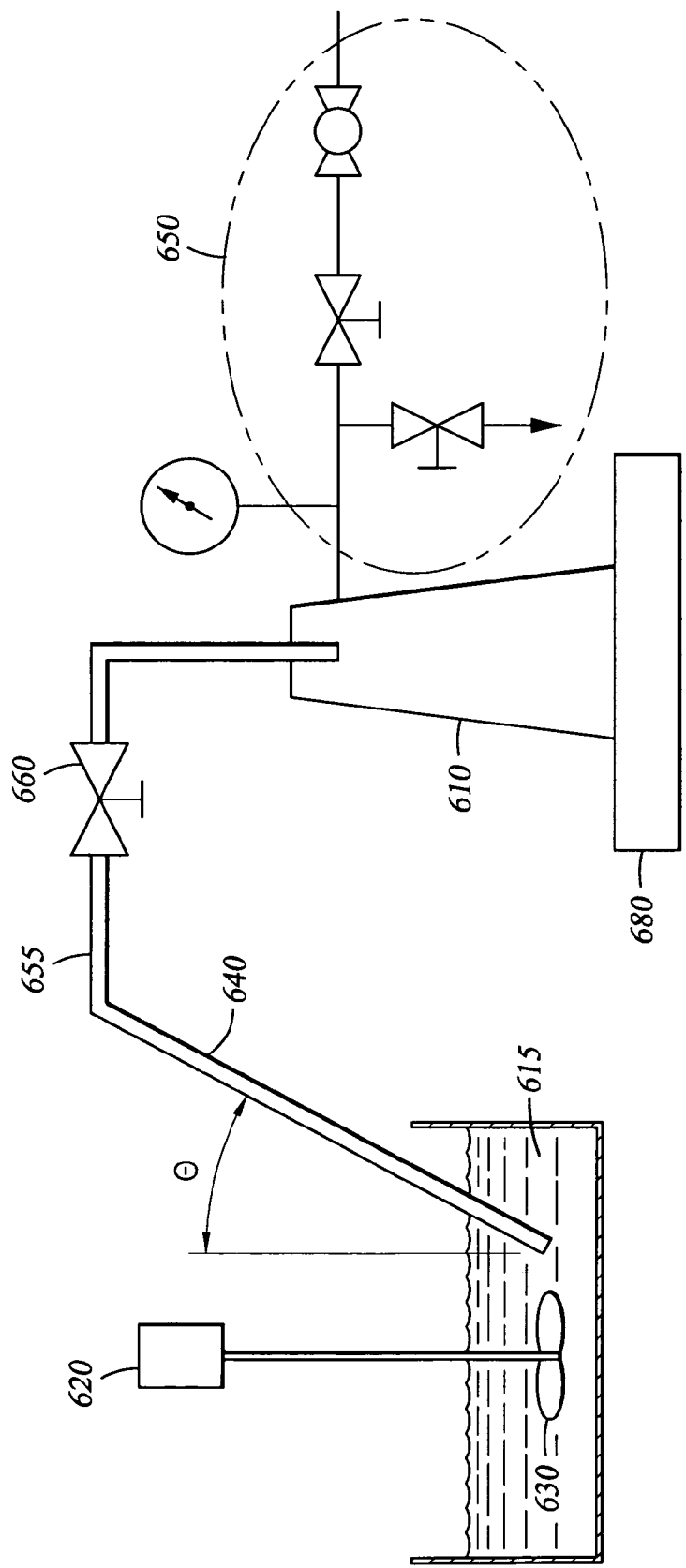
FIG. 12 is a schematic diagram illustrating a laboratory system to evaluate efficiency of separation of a liquid from a catalyst-containing slurry using an inclined tube.

FIG. 12 shows the experimental apparatus. To a 2-gallon container 610, were added 1.5 gallon decane with a specific gravity of 0.73, and 1140 grams of a pre-treated alumina material. The pre-treated alumina material was obtained by calcining gamma-alumina particles with a weight average size of about 70 microns at 1100° C. for 1 hour to increase the density of the alumina material. Mixing the decane and alumina particles resulted in forming a slurry 615 with approximately 20 wt % solids. An electric motor 620 fitted with a 3-bladed propeller-style impeller 630 was used to agitate the slurry 615 and maintain the particles in suspension. A ¾" ID×24"L glass tube 640 was used as the settler and its angle of inclination θ was varied from 0° to 30° from the vertical. The length-to-diameter aspect ratio of the settler tube 340 was 32:1. One end of the settler tube 640 was immerged in the slurry 315, whereas the other end was sent to a collection vessel 670, which was connected to a vacuum apparatus 650. The application of vacuum was used to provide flow of slurry from the container 610 to the settler 640 to provide an overhead stream 655 controlled by a valve 660. The overhead stream 655 was finally collected for a given amount of time in the collection vessel 670 disposed on a scale 680 so as to calculate the flow rate of the overhead stream 655.

Two sets of experiments were conducted at different settler inclinations; the first inclination angle θ used was 0° (vertical), and the second angle θ was 30° from the vertical. The purpose of the experiments was to determine the benefit of inclined settling over vertical settling, and the criteria for comparison was production of clear overflow.

Vacuum was set to 5 inches of mercury, and valve 660 was used to control the flow rate of the overhead stream 655. The flow rate was measured by the time required to collect a given amount of fluid (typically 100–200 g). The flow was adjusted to measure the maximum possible clear overflow. This was achieved by increasing the flow, until the presence of solids was visible in the overhead stream 655, then reducing the flow until a clear overflow was resumed. Table 1 shows data for the two sets of experiments.

It is clear from the data in Table 1 that one can increase settler capacity by inclining the settler from the vertical. In fact, for the system tested in our laboratory, an eight-fold increase in production capacity was observed when the settler 640 was inclined 30° from the vertical, compared to the settler placed vertically.

TABLE 1

Settler Capacity at Different Inclinations.
(20 wt % alumina/decane slurry)

| | Settler Inclination Angle, θ | |
|---|---|---|
| θ | 0° | 30° |
| Capacity (mL/min) | 72 | 571 |
| | 66 | 527 |
| | 69 | 548 |
| | | 553 |
| Average (mL/min) | 69 | 550 |

An experiment was conducted to determine the minimum inclination angle θ at which one could expect enhanced settling performance. The settler tube 640 was set in the vertical position (θ=0°) and the fluid flow was adjusted to bring solids into the settler tube. An interface between regions of high solids content and low solids content was established. The settler tube 640 was then slightly inclined. The settler was fixed at this position and the angle θ of inclination from the vertical was small and determined to be about 3°. Almost immediately, the interface became unstable and regions of upflow and downflow became evident. Further, the interface, though not as well defined, began falling. Therefore, different flow/settling characteristics were observed with almost any angle of inclination from vertical. The clear overflow production was then determined as described in Example 1. Table 2 compares production capacity for a vertical position and for a small inclined position from vertical (θ of about 3°). The data in Table 2 shows an improvement of more than two-times (2.4) even with a small angle of inclination of 3° compared to a vertical position.

TABLE 2

Settler Capacity at small inclination from vertical
(20 wt % alumina/decane slurry).

| | Settler Inclination Angle, θ | |
|---|---|---|
| θ | 0° | 3° |
| Capacity (mL/min) | 72 | 170 |
| | 66 | 162 |
| | 69 | 171 |
| Average (mL/min) | 69 | 168 |

The embodiments set forth herein are merely illustrative and do not limit the scope of the invention or the details herein. It will be appreciated that many other modifications and improvements to the disclosure herein may be made without departing from the scope of the invention or the inventive concepts herein disclosed. Because many varying and different embodiments may be made within the scope of the present inventive concept, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

Should the disclosure of any of the patents and publications that are incorporated herein by reference conflict with the present specification to the extent that it might render a term unclear, the present specification shall take precedence.

What is claimed is:

1. A process for producing hydrocarbons comprising:
   passing gaseous reactants comprising hydrogen and carbon monoxide into a reactor containing a slurry comprising a liquid and a catalyst, wherein the catalyst comprises particles, and contains at least one catalytic metal selected from the group consisting of metals from Groups 8, 9, and 10 of the Periodic Table, and further wherein the slurry comprises between 5 and 25 volume percent of catalyst particles;
   converting at least a portion of gaseous reactants to hydrocarbons over said catalyst, such that a portion of said hydrocarbons are liquid and the slurry includes said liquid hydrocarbons,
   feeding a slurry stream comprising a portion of the slurry to a sedimentation chamber having at least one inclined channel disposed therein, an upper product outlet, and a lower catalyst outlet;
   flowing the slurry stream through the at least one inclined channel in a mostly counter-current manner to settling particles as the slurry gets leaner and leaner in particle content to form a catalyst-lean stream, while most of the catalyst particles settle downwards in the inclined channel so as to form a catalyst-rich stream;
   passing the catalyst-lean stream through the upper product outlet of said sedimentation chamber such that the catalyst-lean stream provides at least a portion of the liquid hydrocarbons;
   passing the catalyst-rich stream through the lower catalyst outlet of said sedimentation chamber; and
   recycling at least a portion of said catalyst-rich stream to the reactor.

2. The process of claim 1 wherein the at least one inclined channel is provided by a pipe, a tube, or a conduit.

3. The process of claim 1 wherein the at least one inclined channel is provided by trays, plates, walls, or sheets.

4. The process of claim 1 wherein the at least one inclined channel has an angle of inclination from the vertical between 2° and 85°.

5. The process of claim 4 wherein the at least one inclined channel has an angle of inclination from the vertical between 3° and 75°.

6. The process of claim 4 wherein the at least one inclined channel has an angle of inclination from the vertical between 5° and 45°.

7. The process of claim 1 wherein the at least one inclined channel has a length-to-depth aspect ratio greater than 2:1.

8. The process of claim 7 wherein the at least one inclined channel has a length-to-depth aspect ratio greater than 5:1.

9. The process of claim 7 wherein the at least one inclined channel has a length-to-depth aspect ratio greater than 10:1.

10. The process of claim 1 wherein the sedimentation chamber comprises a plurality of inclined channels.

11. The process of claim 1 further comprising passing the slurry stream from the reactor to a degasser so as to form a degassed slurry stream.

12. The process of claim 1 further comprising passing the catalyst-lean stream from the sedimentation chamber to a degasser so as to form a degassed catalyst-lean stream.

13. The process of claim 1 wherein at least 90 percent by weight of the catalyst particles in the slurry comprise a size ranging from 10 to 200 microns.

14. The process of claim 1 wherein the catalyst particles in the slurry comprise a weight average size ranging from 40 to 100 microns.

15. The process of claim 1 wherein passing the slurry stream upwards through the at least one inclined channel employs a slurry velocity sufficient so that a substantial portion of the particles exiting the sedimentation chamber in the catalyst-lean stream has a number average particle size less than 20 microns.

16. The process of claim 15 wherein a substantial portion of the particles exiting the sedimentation in the catalyst-lean stream has a number average particle size less than 15 microns.

17. The process of claim 1 further comprising feeding the catalyst-lean stream to a secondary catalyst-liquid separation unit adapted to form a product stream substantially free of particles.

18. The process of claim 17 wherein said secondary catalyst-liquid separation unit comprises a filtration device.

19. The process of claim 18 wherein said secondary catalyst-liquid separation unit is adapted to receive a slurry stream from the reactor that has bypassed the sedimentation chamber.

20. A method for recovering a hydrocarbon product from a slurry comprising catalyst particles, said method comprising the steps of:
    feeding a slurry stream comprising liquid hydrocarbons and catalyst particles into a sedimentation chamber having one inclined surface disposed therein, wherein the catalyst particles in the slurry stream comprise a weight average size ranging from 40 to 100 microns, and further wherein the catalyst particles in the slurry stream comprise fines, and further wherein the inclined surface is adjustable up to 0° for cleaning purposes; and
    flowing the slurry stream over the inclined surface while most of the catalyst particles settle down by density difference between the hydrocarbon liquid and the catalyst particles so as to separate the slurry stream into a catalyst-rich bottom stream and a catalyst-lean overhead stream, wherein the catalyst-lean overhead stream comprises at least a portion of the fines and further comprises a number average particle size less than 20 microns.

21. The method of claim 20 further comprising passing the catalyst-lean overhead stream from the sedimentation chamber to a secondary separation unit so as to generate a product stream substantially free of particles.

22. The method of claim 20 wherein the inclined surface has an angle of inclination from the vertical between 2° and 85°.

23. The method of claim 22 wherein the inclined surface has an angle of inclination from the vertical between 3° and 75°.

24. The method of claim 22 wherein the inclined surface has an angle of inclination from the vertical between 5° and 45°.

25. The method of claim 22 wherein the inclined surface is provided by a structure selected from the group consisting of tube, pipe, conduit sheet, tray, wall, and plate.

26. The method of claim 20 wherein the sedimentation chamber includes one inclined channel comprising said inclined surface.

27. The method of claim 20 wherein the inclined channel has a length-to-dept aspect ratio greater than 2:1.

28. The method of claim 27 wherein the inclined channel has a length-to-depth aspect ratio greater than 5:1.

29. The method of claim 27 wherein the inclined channel has a length-to-depth aspect ratio greater than 10:1.

30. The method of claim 20 wherein the sedimentation chamber comprises a plurality of inclined channels.

31. The method of claim 20 wherein the slurry further comprises a gas.

32. The method of claim 31 further comprising passing the slurry stream to a degasser so as to form a degassed slurry stream.

33. The method of claim 31 further comprising passing the catalyst-lean overhead stream from the sedimentation chamber to a degasser so as to form a degassed catalyst-lean stream.

34. The method of claim 20 wherein at least 90 percent by weight of the catalyst particles in the slurry comprise a size ranging from 10 to 200 microns.

35. The method of claim 20 wherein the catalyst-lean overhead stream comprises a number average particle size less than 15 microns.

36. The method of claim 20 wherein the catalyst-lean overhead stream comprises a number average particle size less than 10 microns.

37. The method of claim 21 wherein said secondary catalyst-liquid separation unit comprises a filtration device.

38. The method of claim 37 wherein said secondary catalyst-liquid separation unit is adapted to receive a slurry stream that has bypassed the sedimentation chamber.

39. A method for removing liquid product from a slurry reactor containing a catalyst-containing slurry comprising liquid product and catalyst particles including fines, comprising the steps of:
    (a) removing a portion of the catalyst-containing slurry from the slurry reactor;
    (b) separating a portion of the liquid product from the catalyst-containing slurry using density differences between the liquid product and the catalyst particles so as to form a liquid product stream and a catalyst-rich slurry, wherein the density of the catalyst particles is at least 0.1 g/ml greater than that of the liquid product in the slurry, and further wherein the catalyst-rich slurry contains at least a portion of the fines in order to allow their removal out of the slurry reactor and to minimize their accumulation in the slurry reactor by not recycling them to the slurry reactor; and
    (c) returning at least a portion of the catalyst-rich slurry back to the reactor.

40. The method according to claim 39, further comprising the step of stripping water from the slurry before step (c).

41. The method according to claim 39, further comprising the step of degassing the portion of slurry before step (b).

42. The method according to claim 39 wherein step (b) uses at least one inclined surface.

43. The method according to claim 39 wherein step (b) uses one or more inclined channels.

* * * * *